United States Patent
Joo et al.

(10) Patent No.: US 10,037,180 B2
(45) Date of Patent: Jul. 31, 2018

(54) DEVICE AND METHOD FOR PROVIDING USER INTERFACE SCREEN

(71) Applicant: S-PRINTING SOLUTION CO., LTD., Suwon-si, Gyeonggi-do (KR)

(72) Inventors: Jin-myung Joo, Seoul (KR); Young-soo Han, Yongin-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 506 days.

(21) Appl. No.: 14/635,062

(22) Filed: Mar. 2, 2015

(65) Prior Publication Data
US 2015/0346985 A1    Dec. 3, 2015

(30) Foreign Application Priority Data
Jun. 3, 2014    (KR) .................. 10-2014-0067795

(51) Int. Cl.
| G06F 3/048 | (2013.01) |
| G06F 3/12 | (2006.01) |
| G06F 3/0484 | (2013.01) |
| G06F 9/451 | (2018.01) |
| G06F 9/4401 | (2018.01) |
| G06F 9/44 | (2018.01) |

(52) U.S. Cl.
CPC ........ *G06F 3/1276* (2013.01); *G06F 3/04842* (2013.01); *G06F 3/1205* (2013.01); *G06F 3/1258* (2013.01); *G06F 9/4411* (2013.01); *G06F 9/4443* (2013.01); *G06F 9/451* (2018.02)

(58) Field of Classification Search
CPC .................................................... G06F 3/0481
See application file for complete search history.

(56) References Cited

U.S. PATENT DOCUMENTS

| 6,574,002 | B1 * | 6/2003 | Paczewitz ............. G06F 3/1205 358/1.1 |
| 7,627,822 | B2 | 12/2009 | Konuma et al. |
| 2008/0266255 | A1 | 10/2008 | Lawson et al. |
| 2009/0027708 | A1 | 1/2009 | Maheshwari |
| 2010/0007613 | A1 | 1/2010 | Costa |
| 2013/0095887 | A1 | 4/2013 | Chang et al. |
| 2013/0191779 | A1 | 7/2013 | Radakovitz et al. |
| 2013/0235402 | A1 * | 9/2013 | Yamamichi ........... G06F 3/1204 358/1.13 |

FOREIGN PATENT DOCUMENTS

| EP | 2725775 | 4/2014 |
| JP | 2007-11459 | 1/2007 |
| KR | 10-2013-0032924 | 4/2013 |

OTHER PUBLICATIONS

Microsoft, "Detecting and Tracking Multiple Touch Points", 2014, 7 pages.

(Continued)

*Primary Examiner* — Matthew Ell
(74) *Attorney, Agent, or Firm* — Staas & Halsey LLP

(57) ABSTRACT

A method for providing a user interface screen in a device includes receiving a user input for manipulating a user interface of a printer driver installed in the device, determining a type of an input used for the received user input, determining a display style of the user interface corresponding to the determined type of the input, and providing the user interface presented in the determined display style.

21 Claims, 29 Drawing Sheets

(56) References Cited

OTHER PUBLICATIONS

Microsoft, "Getting Started with Windows Touch Messages", 2014, 4 pages.
European Office Action dated Jun. 17, 2015 in European Patent Application No. 15158309.3.
European Search Report dated Jun. 8, 2015 in European Patent Application No. 15158309.3.
International Search Report and Written Opinion of the International Searching Authority dated Jun. 4, 2015 in International Patent Application No. PCT/KR2015/002412.

* cited by examiner

<OS OPERATING WITH CURSOR-INPUT BASED UI DESIGN>

<EXECUTE PRINTER DRIVER>

<DISPLAY WITH LEGACY STYLE UI>

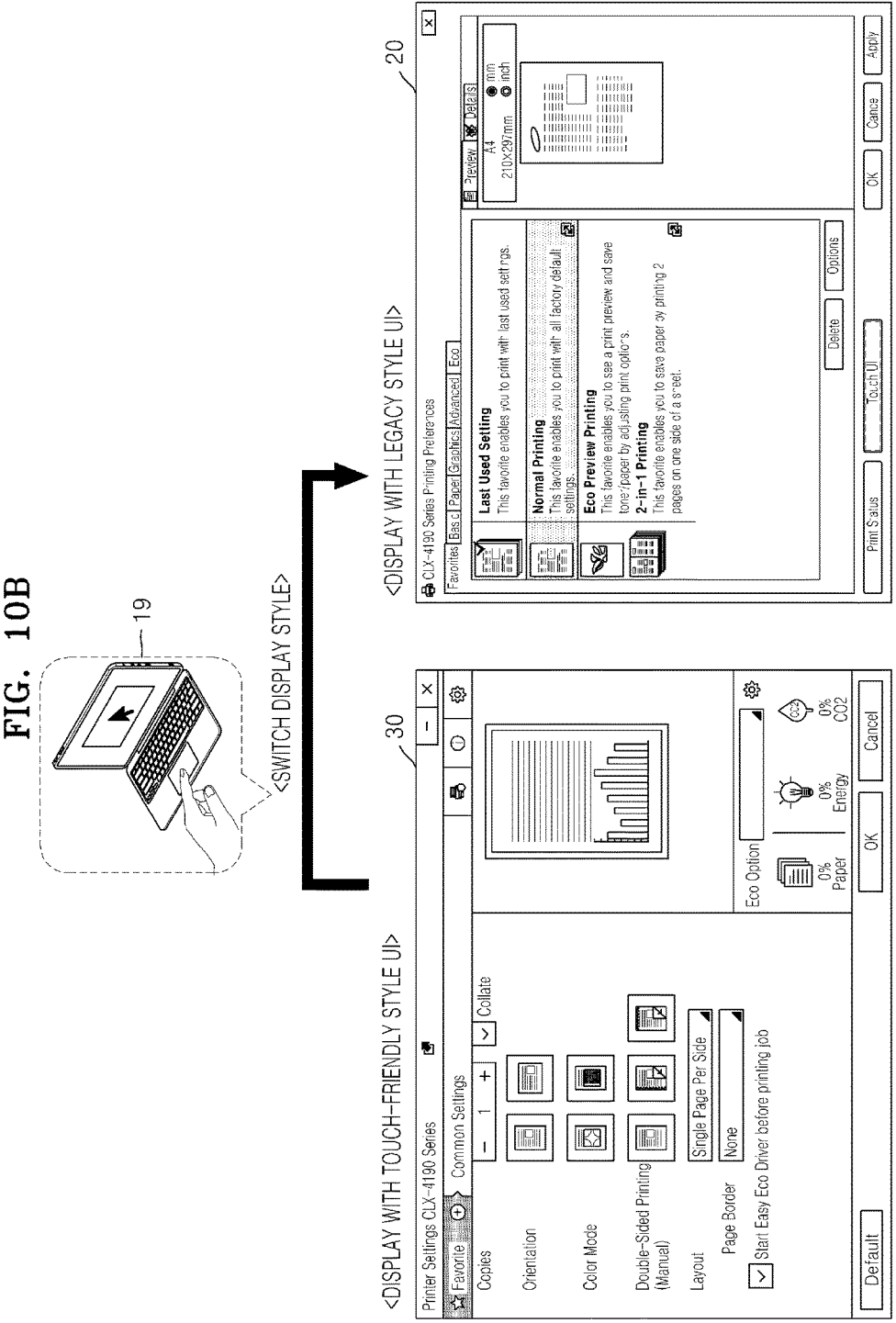

DEVICE AND METHOD FOR PROVIDING USER INTERFACE SCREEN

CROSS-REFERENCE TO RELATED APPLICATIONS

This application claims the priority benefit of Korean Patent Application No. 10-2014-0067795, filed on Jun. 3, 2014, in the Korean Intellectual Property Office, the disclosure of which is incorporated herein in its entirety by reference.

BACKGROUND

1. Field

The following description relates to a device and a method for providing a user interface (UI) screen in the device, and more particularly, to a method for providing a UI screen corresponding to a printer driver in a device capable of receiving both a touch input and a cursor input.

2. Description of the Related Art

Recently, in addition to traditional computing devices such as personal computers (PCs) and laptop computers, mobile computing devices such as smartphones and table devices are widely used. The mobile computing devices are basically equipped with a variety of operating systems (OS's) such as MS-DOS, Windows OS, LINUX, Macintosh (MAC) OS, Android OS, or iOS.

When a user operates a mobile computing device, various types of content supported by the OS may be used. For example, the user may look at an image, edit a document, watch a movie, or listen to music by using the mobile computing device. In this case, the user may wish to print content that is being used. When the user requests printing of the content that is being used in the mobile computing device, most OS's execute a printer driver that is previously installed in the mobile computing device to print the content.

SUMMARY

One or more embodiments of the present disclosure include a device, and a method for providing a user interface (UI) screen in the device.

One or more embodiments of the present disclosure include a computer-readable recording medium having recorded thereon a program for executing the above method.

Additional aspects will be set forth in part in the description which follows and, in part, will be apparent from the description, or may be learned by practice of the presented embodiments.

According to one or more embodiments of the present disclosure, a method for providing a user interface screen in a device includes receiving a user input for manipulating a user interface of a printer driver installed in the device, determining a type of an input used for the received user input, determining a display style of the user interface corresponding to the determined type of the input, and providing the user interface presented in the determined display style.

In the providing of the user interface, the user interface of the printer driver may be switchable to a different display style according to the determined type of the input.

The display style that is switchable may be a legacy style or a touch-friendly style.

In the determining of the display style of the user interface, a legacy style may be determined as the display style if the determined type of the input is a cursor input and a touch-friendly style may be determined as the display style if the determined type of the input is a touch input.

In the determining of the display style of the user interface, if the determined type of the input does not correspond to a first style, a second style that corresponds to the determined type of the input may be determined, and in the providing of the user interface, the user interface may be provided by switching the first style that is currently displayed to the determined second style.

In the providing of the user interface, if the determined type of the input is a touch input in a state in which the user interface is currently displayed in a legacy style, the user interface may be provided by switching the legacy style to a touch-friendly style, and if the determined type of the input is a cursor input in a state in which the user interface is currently displayed in the touch-friendly style, the user interface may be provided by switching the touch-friendly style to the legacy style.

The method may further include determining whether a pop-up print option of the printer driver is selected by the received user input, in which, in the providing of the user interface, if it is determined that the pop-up print option is selected, the user interface may be provided by displaying a pop-up window for the pop-up print option in the determined display style.

In the providing of the user interface, when the pop-up print option is selected by a touch input in a state in which the user interface is currently displayed in a legacy style, the user interface may be provided by displaying the pop-up window in a touch-friendly style, and when the pop-up print option is selected by a cursor input in a state in which the user interface is currently displayed in the touch-friendly style, the user interface may be provided by displaying the pop-up window in the legacy style.

The method may further include, if it is determined that the pop-up print option is selected, determining whether to switch an entire user interface to the determined display style, in which, in the providing of the user interface, the user interface may be provided by displaying at least one of the pop-up window and the entire user interface in the determined display style.

The method may further include executing the printer driver, and when the printer driver is executed, displaying the user interface in a default style depending on a current user interface design of an operating system (OS), in which, in the receiving of the user input, the user input for manipulating the user interface displayed in the default style may be received.

The printer driver may include at least one of a version 3 (V3) printer driver or a version 4 (V4) printer driver.

The method may further include, if the printer driver is the V3 printer driver, storing in a shared memory printer driver information (Devmode) that is used by the printer driver of a legacy style and the printer driver of the touch-friendly style, in which, in the providing of the user interface, the user interface may be switched to the legacy style or the touch-friendly style based on stored printer driver information (Devmode).

According to one or more embodiments of the present disclosure, a method for providing a user interface screen in a device includes displaying in a first style a user interface of a printer driver installed in the device, receiving a user input for manipulating the displayed user interface, determining a type of an input used for the received user input, if the type of the determined input does not correspond to the first style, determining a second style corresponding to the determined type of the input, and providing the displayed user interface by switching the first style to the determined second style.

According to one or more embodiments of the present disclosure, there is provided a computer readable recording medium having recorded thereon a program for executing the above method.

According to one or more embodiments of the present disclosure, a device for providing a user interface screen includes an input interface receiving a user input for manipulating a user interface of a printer driver installed in the device, a controller determining a type of an input used for the received user input and determining a display style of the user interface corresponding to the determined type of the input, and a display interface providing the user interface presented in the determined display style.

The user interface of the printer driver that is provided by the display interface may be switchable to a different display style according to the determined type of the input.

The controller may determine a legacy style as the display style if the determined type of the input is a cursor input, and a touch-friendly style as the display style if the determined type of the input is a touch input If the determined type of the input does not correspond to a first style that is currently displayed, the controller may determine a second style corresponding to the determined type of the input, and the display interface may provide the user interface by switching the first style that is currently displayed to the determined second style.

The controller may further determine whether a pop-up print option of the printer driver is selected by the received user input, and if it is determined that the pop-up print option is selected, the user interface may be provided by displaying a pop-up window for the pop-up print option in the determined display style.

If it is determined that the pop-up print option is selected, the controller may further determine whether to switch an entire user interface to the determined display style, and the display interface may provide the user interface by displaying at least one of the pop-up window and the entire user interface in the determined display style.

The controller may execute the printer driver, and when the printer driver is executed, the display interface may display the user interface in a default style depending on a current user interface design of an operating system (OS), and the input interface may receive the user input for manipulating the user interface displayed in the default style.

The device may further include, if the printer driver is a V3 printer driver, a memory storing printer driver information (Devmode) that is used by the printer driver of a legacy style and the printer driver of the touch-friendly style, and the controller may control by using stored printer driver information (Devmode) such that the user interface is switched to the legacy style or the touch-friendly style.

According to one or more embodiments of the present disclosure, a device for providing a user interface screen includes a display interface displaying in a first style a user interface of a printer driver installed in the device, an input interface receiving a user input for manipulating the displayed user interface, and a controller determining a type of an input used for the received user input, and if the determined type of the input does not correspond to the first style, determining a second style corresponding to the determined type of the input, in which the display interface provides the displayed user interface by switching the first style to the determined second style.

BRIEF DESCRIPTION OF THE DRAWINGS

These and/or other aspects will become apparent and more readily appreciated from the following description of the embodiments, taken in conjunction with the accompanying drawings in which:

FIG. 10B illustrates switching of a display style of a printer driver UI according to a cursor input, according to an embodiment;

DETAILED DESCRIPTION

Figure 1A:
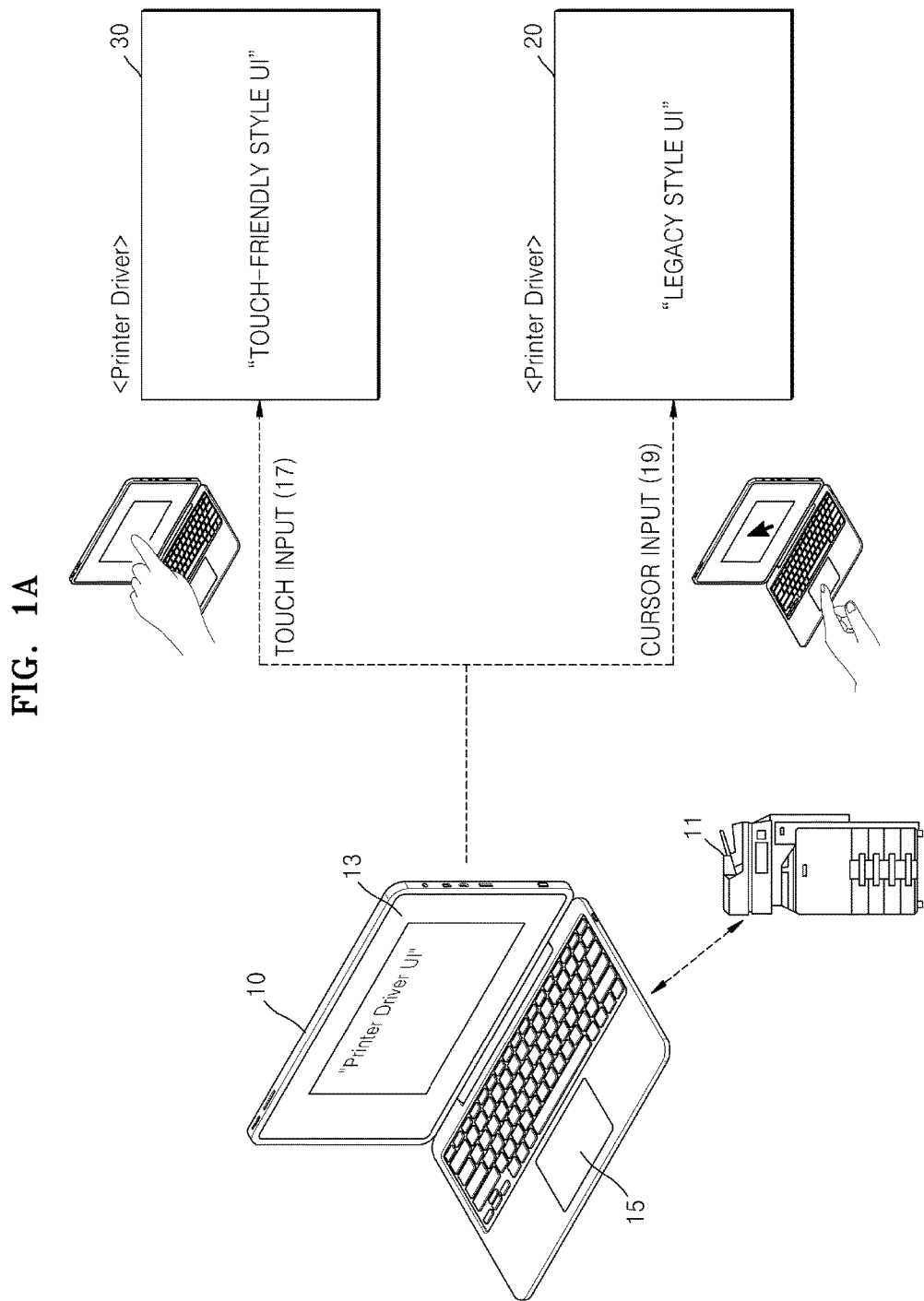
FIG. 1A illustrates a user interface (UI) screen in a device, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

FIG. 1A is a view for describing providing of a user interface (UI) screen in a device 10, according to an embodiment.

Referring to FIG. 1A, the device 10 may be a personal computer (PC), a laptop computer, a smartphone, a tablet device, an electronic-book device, a smart TV, a digital broadcasting device, a personal digital assistant (PDA), a portable multimedia player (PMP), or a navigation device, for example. Also, the device 10 may be an image forming apparatus 11 such as a printer, a scanner, or a multifunctional device, for example. In FIG. 1A, for convenience of explanation, the device 10 is illustrated as being a laptop computer.

Figure 3:
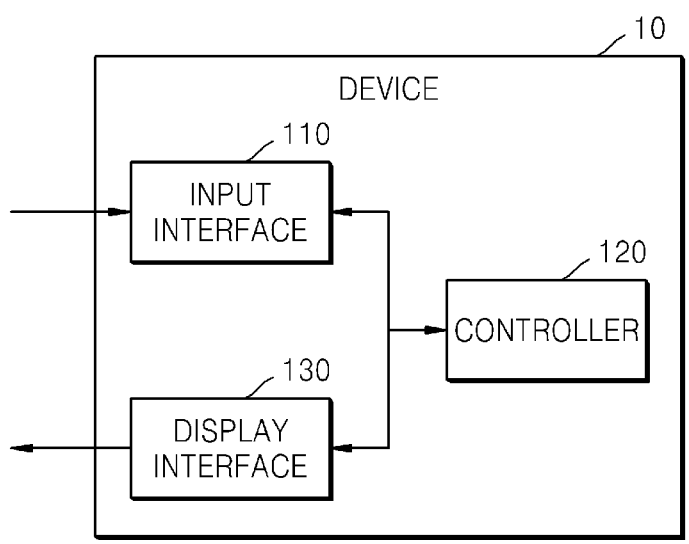
FIG. 3 is a block diagram illustrating a hardware structure of a device providing a UI screen, according to an embodiment.

The device 10 may include devices for interfacing with a user. For example, the device 10 may include an input interface 110 and a display interface 130, as illustrated in FIG. 3.

The input interface 110 may be a hardware structure used by a user to input desired information to the device 10 and may be, for example, a keyboard, a mouse, a touch screen 13, or a touch pad 15. The touch screen 13 may be embodied to detect not only a touch position and a touch area, but also a touch pressure. Also, the touch screen 13 may be embodied to detect not only a real touch, but also a proximity touch. While the real touch signifies a touch made by physically (or directly) contacting the touch screen 13, the proximity touch signifies a touch made via an input medium, such as a user's finger, by effecting a touch at a distance from a screen. A touch input 17 may be generated by input such as fingers, electronic pens, etc.

The display interface 130 is a hardware structure to display information processed by the device 10 to a user and may be, for example, a liquid crystal display (LCD) panel, a light emitting diode (LED) display panel, or a plasma display panel (PDP).

The device 10 of FIG. 1A may include the touch screen 13 or a touch panel embodied in an integrated structure of the input interface 110 and the display interface 130 to simultaneously detect the touch input 17 of a user and display information to the user. In other words, the device 10 may include both an input, such as the touch pad 15 or the mouse, to manipulate a cursor or a pointer on an UI screen and an input, such as the touch screen 13, to manipulate a UI by directly touching the UI screen, as the input interface 110. According to the present embodiment, the touch screen 13 and the touch pad 15 are different input interfaces having different purposes as described above.

Various types of operating systems (OS's) may be installed in the device 10. For example, the OS may include, MS-DOS, Windows, LINUX, Macintosh (MAC) OS, Android OS, or iOS.

The OS installed in the device 10 supports a printer driver to control a print work or a scanning work of the image forming apparatus 11. For example, when the OS is Microsoft's Windows, the OS may support a version 3 (V3) printer driver or a version 4 (V4) printer driver.

When the user desires to print content through the image forming apparatus 11 while using an application program installed on the OS, the user executes a printer driver installed on the OS.

When the printer driver is executed, the display interface 130 of the device 10 displays a printer driver UI. In other words, referring to FIG. 1A, when the printer driver is executed, the printer driver UI may be displayed on the touch screen 13 of the device 10.

When the printer driver UI displayed on the device 10 is designed to be familiar to users using the cursor input 19, the manipulation of the printer driver UI using the touch pad 15 may be convenient for the user, but the manipulation of the printer driver UI using the touch screen 13 may be inconvenient for the user. The cursor input 19 refers to an input method for manipulating a cursor or a pointer displayed on a display screen. A different term such as a mouse input, a touch pad input, etc., may be used instead of the "cursor input 19".

In general, because the printer driver UI is designed to be optimized for the cursor input 19 and the sizes and arrangement of clickable buttons are designed in consideration of the size of a cursor or a movement range of the cursor, use of the touch input 17 using the touch screen 13 may be inconvenient for the user. In contrast, because the printer driver UI is designed to be optimized for the touch input 17 and the sizes of clickable buttons are relatively large or an arrangement interval between the clickable buttons is large, use of the cursor input 19 via the touch pad 15 may be inconvenient for the user.

As described above, the device 10 may include as the input interface 110 different input interfaces of the touch pad 15 for receiving the cursor input 19 and the touch screen 13 for receiving the touch input 17. Accordingly, the user may manipulate the printer driver UI through the touch input 17 or the cursor input 19. When the printer driver UI is designed to be optimized for any one input, the user may be inconvenienced.

The device 10 according to the present embodiment provides a printer driver UI designed to correspond to the type of an input that is used by a current user. Accordingly, a user experience (UX), which enables easy manipulation of the printer driver UI regardless of the type of an input, may be provided.

In detail, when a printer driver is executed in the device 10 and the touch input 17 by a user is detected, the device 10 displays a printer driver of a touch-friendly style UI that is designed to be convenient for the touch input 17. Also, when a printer driver is executed in the device 10 and the cursor input 19 by a user is detected, the device 10 displays a printer driver of a legacy style UI that is designed to be convenient for the cursor input 19.

The touch-friendly style UI is designed by considering the size of a finger used for the touch input 17 by a user, a touch position of the finger, etc. and may be a UI with relatively large input buttons. For example, the touch-friendly UI of the Windows 8 series OS, Android UI, iOS UI, etc. may correspond to the touch-friendly style UI. Any UI designed to be convenient for the touch input 17 may be referred to as the touch-friendly style UI and the term for the touch-friendly style UI may be variously modified.

The legacy style UI is designed considering the size of a cursor used for the cursor input 19 and may correspond to, for example, a UI of a dialog window on the Windows XP OS or Windows 7 OS. In other words, in general, the legacy style UI refers to a classic style UI that have been widely used for OS's before a touch screen is commonly used and may be named in various ways, for example, a classic style UI.

The device 10 may switch the UI of a printer driver between a touch-friendly style 30 and a legacy style 20 according to a type of an input used by a current user such as the touch input 17 or the cursor input 19.

For example, when the touch input 17 is detected in a state in which the printer driver UI of the legacy style 20 is currently displayed, the device 10 switches the printer driver UI to the touch-friendly style 30 that is optimized for the touch input 17. In contrast, when the cursor input 19 is detected in a state in which the printer driver UI of the touch-friendly style 30 is currently displayed, the device 10 switches the printer driver UI to the legacy style 30 that is optimized for the cursor input 19.

Figure 1B:
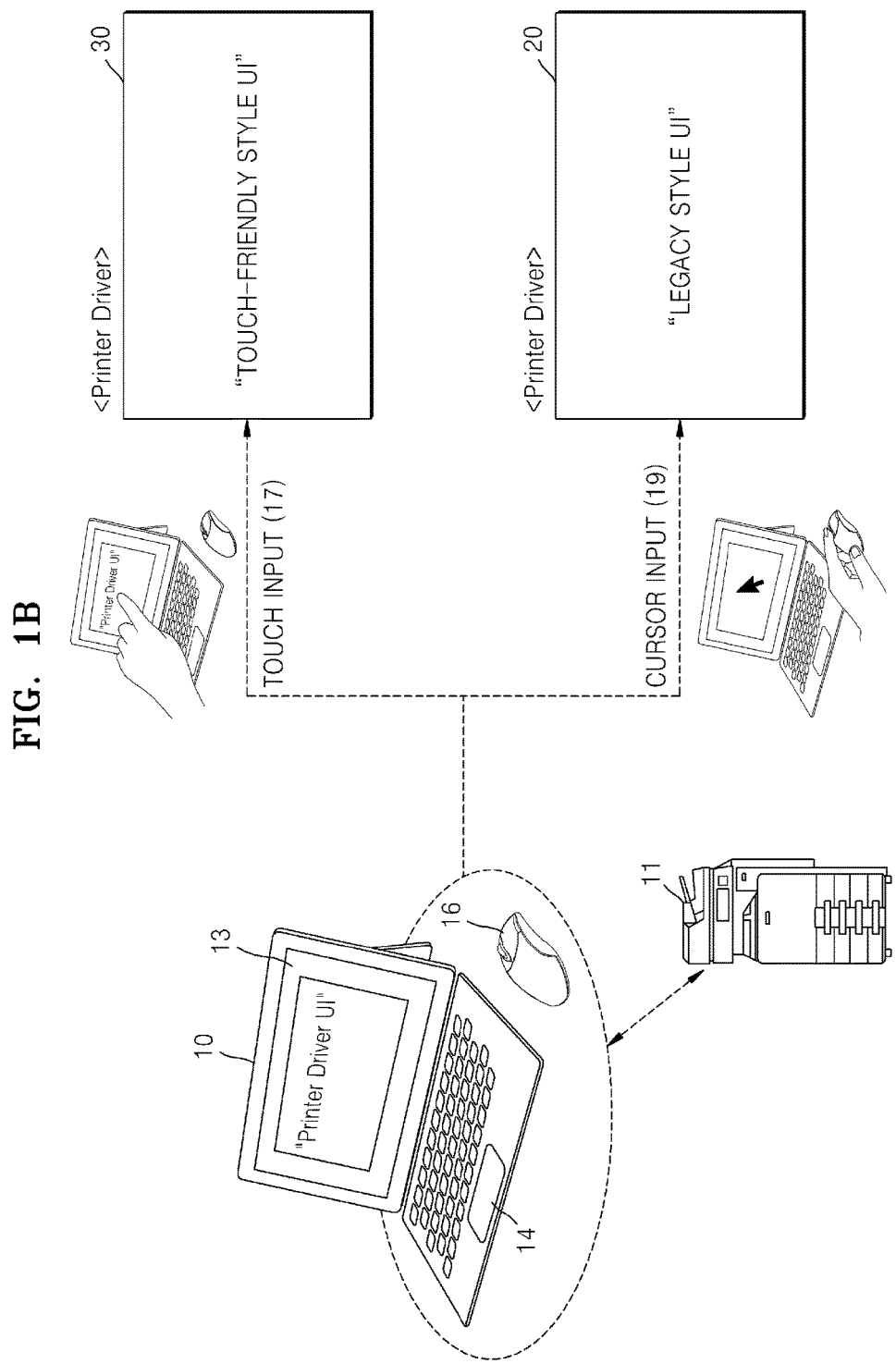
FIG. 1B illustrates a UI screen in a device, according to an embodiment.

FIG. 1B is a view for describing providing of a UI screen in a device, according to an embodiment.

Although the device 10 is assumed to be a laptop computer in FIG. 1A, the device 10 is assumed to be a tablet device in the following description with reference to FIG. 1B.

The device 10 that is a tablet device may be used by being connected to a keyboard 14, a mouse 16, etc., as the input interface 110. Also, the device 10 that is a tablet device is equipped with the touch screen 13. Accordingly, the device 10 may receive both the touch input 17 through the touch screen 13 and the cursor input 19 through the mouse 16.

As described above with reference to FIG. 1A, the device 10 that is a tablet device may switch the UI corresponding to a printer driver between the touch-friendly style 30 and the legacy style 20 according to the type of an input used by a current user such as the touch screen 13 for the touch input 17 or the mouse 16 for the cursor input 19.

Figure 1C:
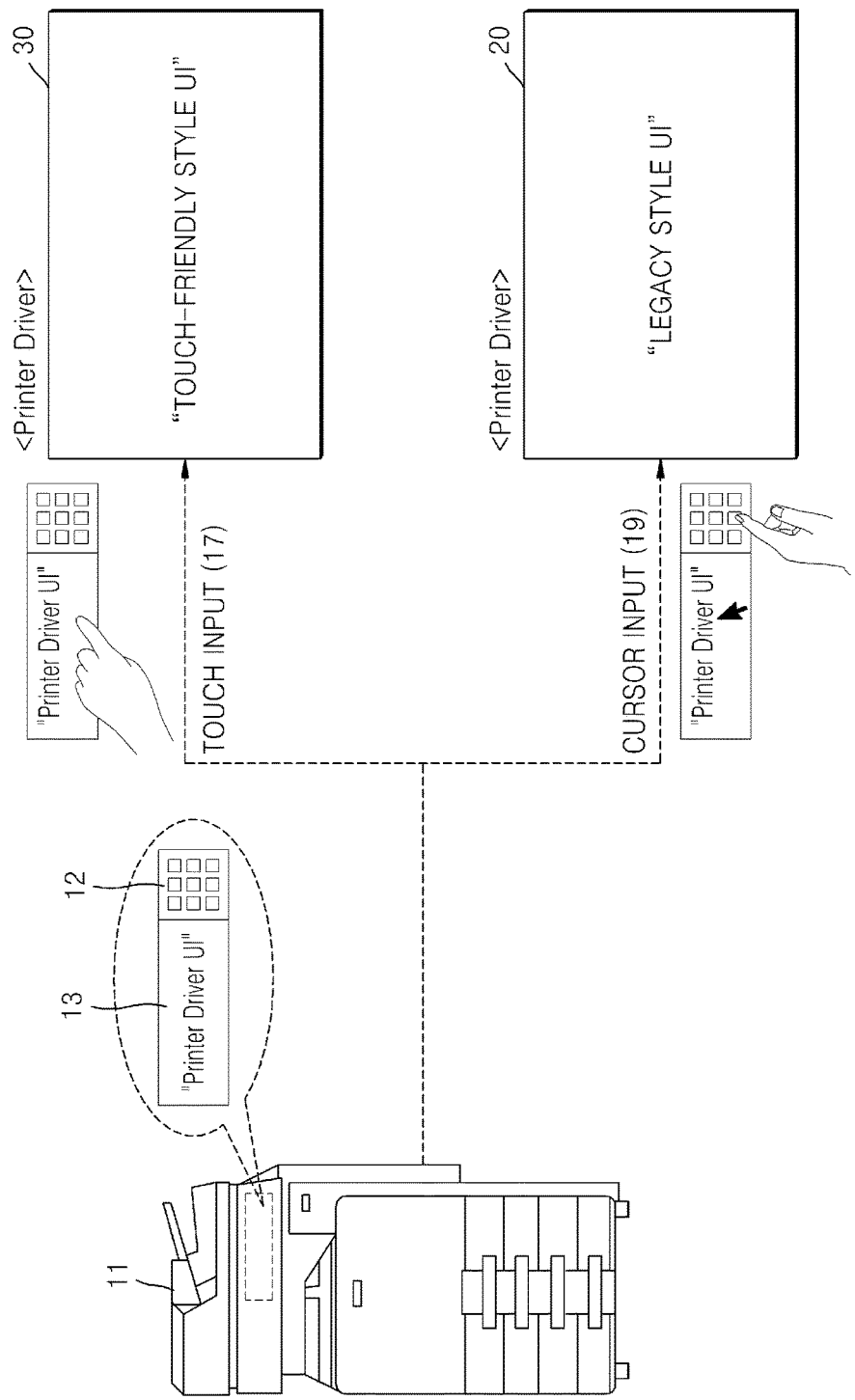
FIG. 1C illustrates a UI screen in an image forming apparatus, according to an embodiment.

FIG. 1C is a view for describing providing of a UI screen in an image forming apparatus 11, according to an embodiment;

In FIG. 1C, it is assumed that the device 10 is the image forming apparatus 11.

The image forming apparatus 11 may include a keypad 12 and the touch screen 13 as the input interface 110. Accordingly, the image forming apparatus 11 may receive both the touch input 17 through the touch screen 13 and the cursor input 19 through the keypad 12.

As described above with reference to FIGS. 1A and 1B, the image forming apparatus 11 may switch the UI corresponding to a print application program (printer driver) installed in the image forming apparatus 11 between the touch-friendly style 30 and the legacy style 20 according to the type of an input used by a current user such as the touch screen 13 for the touch input 17 or the keypad 12 for the cursor input 19.

Figure 2A:
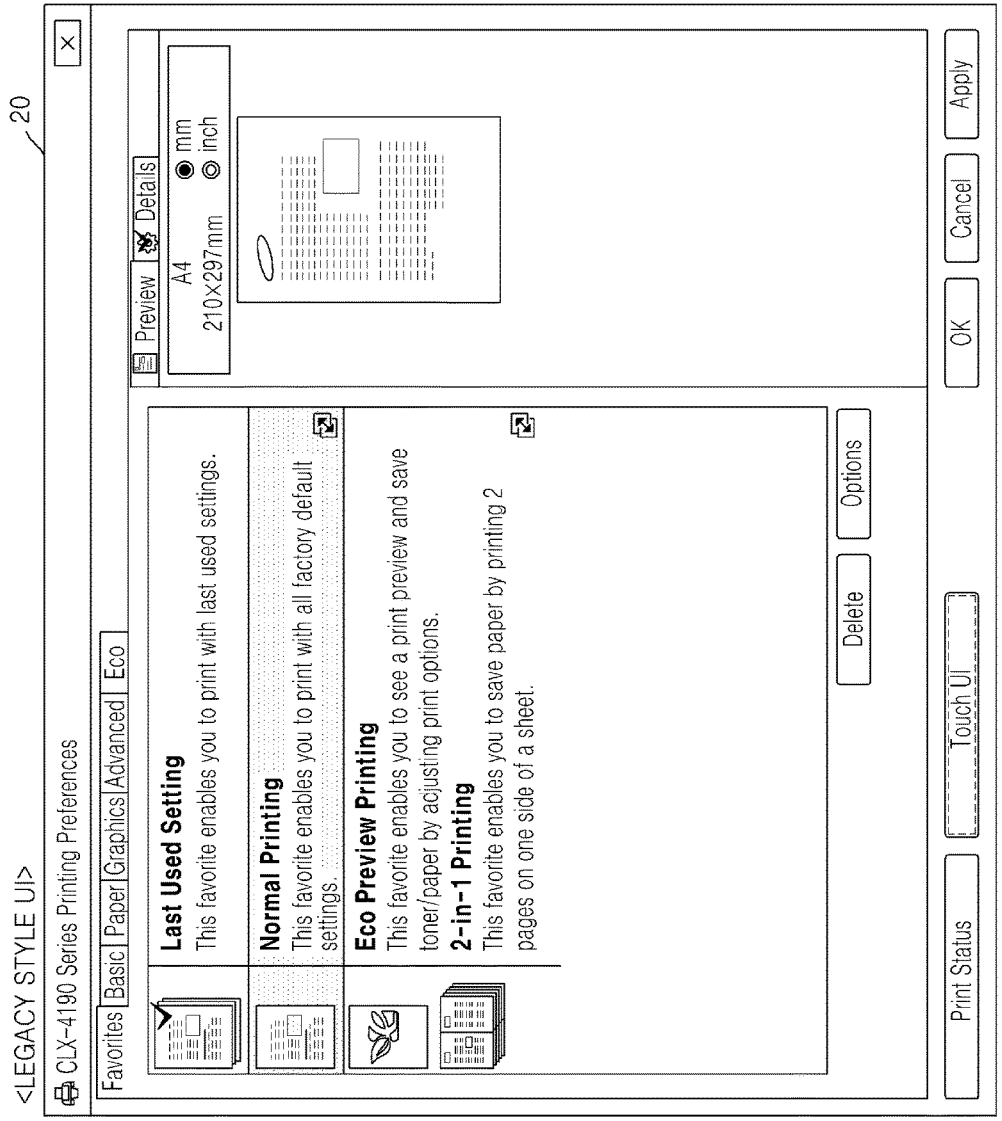
FIG. 2A illustrates a printer driver UI of a legacy style, according to an embodiment.

FIG. 2A illustrates a printer driver UI of a legacy style, according to an embodiment.

Referring to FIG. 2A, as described above, the legacy style UI 20 of a printer driver may correspond to, for example, a UI design of a dialog window of the Windows XP OS or Windows 7 OS. However, the legacy style UI 20 of FIG. 2A is illustrated as an example for convenience of explanation and the legacy style UI 20 according to the present embodiment is not limited to the above design.

Figure 2B:
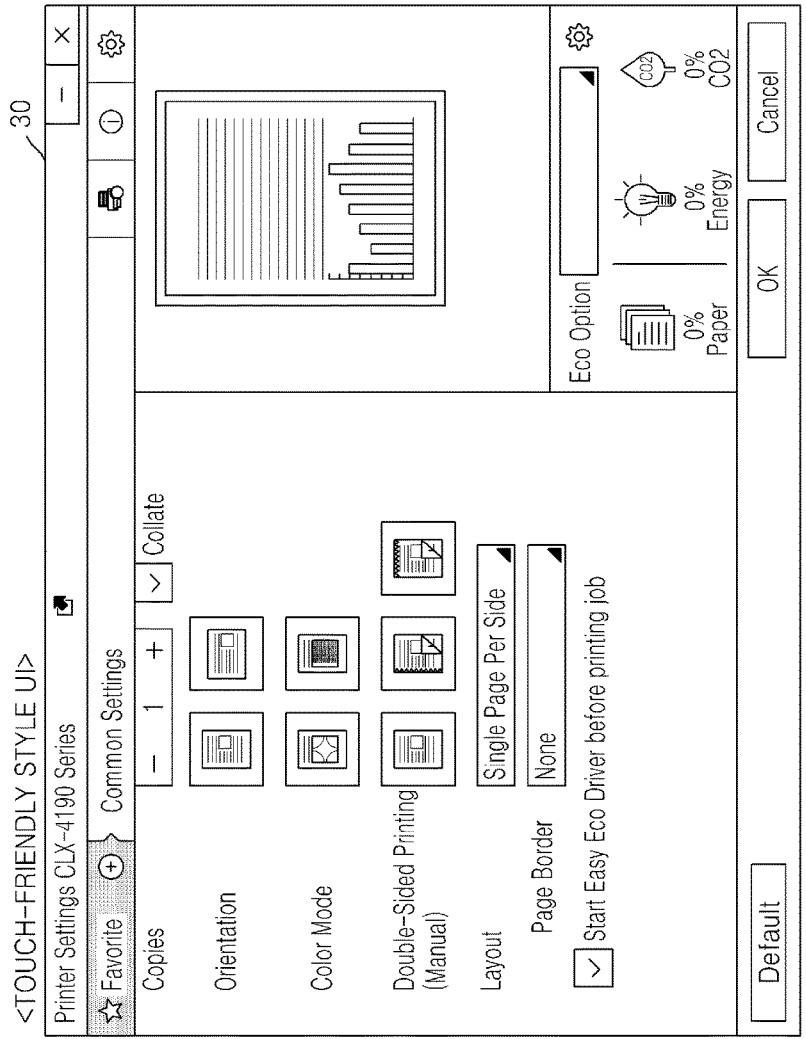
FIG. 2B illustrates a printer driver UI of a touch-friendly style, according to an embodiment.

FIG. 2B illustrates a printer driver UI of a touch-friendly style, according to an embodiment.

Referring to FIG. 2B, as described above, the touch-friendly style UI 30 of a printer driver may correspond to, for example, a UI design of a dialog window of the Windows 8 series OS. Compared with the legacy style UI 20 of FIG. 2A, the size of a button in the touch-friendly style UI 30 may be relatively large in comparison to the legacy-style UI 20 in order to facilitate a touch by a user. However, the touch-friendly style UI 30 of FIG. 2B is illustrated as an example for convenience of explanation and the touch-friendly style UI 30 according to the present embodiment is not limited to the above design.

FIG. 3 is a block diagram illustrating a hardware structure of a device providing a UI screen, according to an embodiment.

The device 10 may include the input interface 110, a controller 120, and the display interface 130. As described above, because the device 10 may be a PC, a laptop computer, a smartphone, a tablet device, an electronic-book device, a smart TV, a digital broadcasting device, a PDA, a PMP, a navigation device, the image forming apparatus 11, etc., one of ordinary skill in the art may understand that the device 10 may include other common hardware structures according to the type of the device 10, in addition to the input interface 110, the controller 120, and the display interface 130.

The input interface 110 is a hardware structure including the touch screen 13 for the touch input 17, the mouse 16 for the cursor input 19, the keyboard 14, or the keypad 12. The input interface 110 may detect the touch input 17 through a contact of the touch screen 13 or the cursor input 19 through a click of the mouse 16.

The input interface 110 receives a user input for manipulating the UI corresponding to a printer driver. The user input may include the touch input 17 and the cursor input 19.

The controller 120 is a hardware structure embodied by at least one of processors such as a central processing unit (CPU), an application processor (AP), etc. and controls an overall operation of the device 10. For example, the controller 120 may drive the OS installed in the device 10 and may execute a printer driver installed on the OS in response to a print request of a user.

The controller 120 determines a type of an input used for a user input received by the input interface 110. In other words, when a contact of the touch screen 13 is detected by the input interface 110, the controller 120 may determine that the input is the touch input 17. When a click of the mouse 16 is detected by the input interface 110, the controller 120 may determine that the input is the cursor input 19. Also, when the touch input 17 is detected by the input interface 110, the controller 120 may determined that the input is the touch screen 13. When the cursor input 19 is detected by the input interface 110, the controller 120 may determine that the input is the mouse 16.

The controller 120 determines a display style of a UI corresponding to a determined type of the input. In other words, when the determined type of the input is the cursor input 19 or the mouse 16, the controller 120 may determine to use the legacy style 20 corresponding to the cursor input 19 or the mouse 16. Alternatively, if the determined type of the input is the touch input 17 or the touch screen 13, the controller 120 may determine to provide the touch-friendly style 30 corresponding to the touch input 17 or the touch screen 13.

In detail, if the determined type of the input does not correspond to a first style that is currently displayed, the controller 120 may determine to provide a second style that corresponds to the determined type of the input.

In other words, if the determined type of the input is the touch input 17 in a state in which a current printer driver UI is the legacy style UI 20, the controller 120 may determine the display style to be the touch-friendly style UI 30 such that the legacy style UI 20 is switched to the touch-friendly style UI 30. Also, if the determined type of the input is the cursor input 19 in a state in which a printer driver UI is the touch-friendly style UI 30, the controller 120 may determine the display style to be the legacy style 20 such that the touch-friendly style UI 30 is switched to the legacy style 20.

The display interface 130 is a hardware structure embodied by a display panel that may display a UI screen. For example, the display interface 130 may display a printer driver UI.

The display interface 130 provides a printer driver UI in a display style determined by the controller 120. In other words, if the controller 120 determines the legacy style UI 20, the display interface 130 provides the legacy style UI 20 as the printer driver UI. Alternatively, if the controller 120 determines the touch-friendly style UI 30, the display interface 130 provides the touch-friendly style UI 30 as the printer driver UI.

In detail, if the type of the input determined by the controller 120 is the touch input 17 in a state in which a current printer driver UI is the legacy style UI 20, the display interface 130 may provide the printer driver UI by switching the legacy style UI 20 to the touch-friendly style UI 30. Also, if the type of the input determined by the controller 120 is the cursor input 19 in a state in which a current printer driver UI is the touch-friendly style 30, the display interface 130 may provide the printer driver UI by switching the touch-friendly style UI 30 to the legacy style UI 20.

Accordingly, the display interface 130 may provide a UI of a printer driver that is switchable to a different display style between the touch-friendly style 30 and the legacy style 20 according to the type of the input currently input by a user, such as, the touch input 17 or the cursor input 19, for example.

Figure 4A:
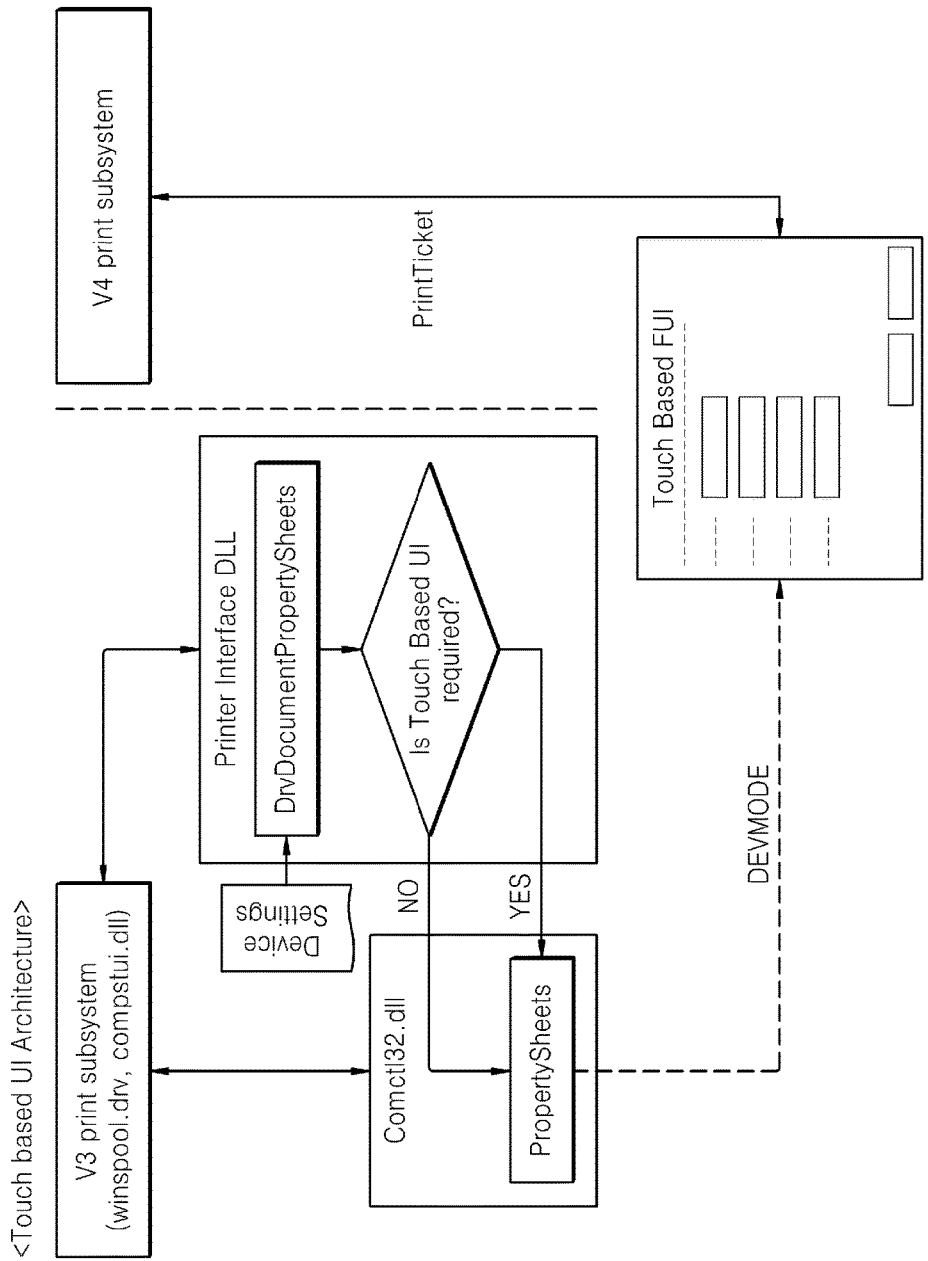
FIG. 4A is a block diagram illustrating an architecture of a printer driver to provide a touch-friendly style UI, according to an embodiment.

FIG. 4A is a block diagram for describing an architecture of a printer driver to provide a touch-friendly style UI, according to an embodiment.

A printer driver may be a V3 printer driver or a V4 printer driver. In FIG. 4A and the drawings regarding an architecture of a printer driver to be described below, and descriptions related thereto, although the names of module or functions may be changed, any module or function capable of operating with the same or similar functions belong to the scope of the present embodiment.

A V3 print subsystem is an OS module for performing processes from spooling of a V3 printer driver to generating of a printer driver UI.

A V4 print subsystem is an OS module for performing processes from spooling of a V4 printer driver to generating of a printer driver UI.

"Comctl32.dll" is an OS module for performing a common control of a printer driver UI of the V3 printer driver.

"Printer Interface DLL" is a customized module for a printer driver that is capable of switching between the legacy style UI 20 and the touch-friendly style UI 30 based on the type of the input according to the present embodiment and is a module for interfacing between the OS and the printer driver.

"Touch Based FUI" is a customized module for the above-described printer driver according to the present embodiment, and an executable file (EXE file) to launch the touch-friendly style UI 30.

"DEVMODE" is printer driver information for the V3 printer driver and indicates information about print settings.

"PrintTicket" is printer driver information of a driver supporting a XML paper specification (XPS) like the V4 printer driver, and indicates information about print settings.

When the touch input 17 is received, the V3 printer driver executes an executable file of the Touch Based FUI to display the above-described touch-friendly style UI 30. When the printer driver UI is switched between the legacy style UI 20 and touch-friendly style UI 30, the V3 printer driver may acquire DEVMODE about print settings through a shared memory 140 of FIG. 5.

Figure 5:
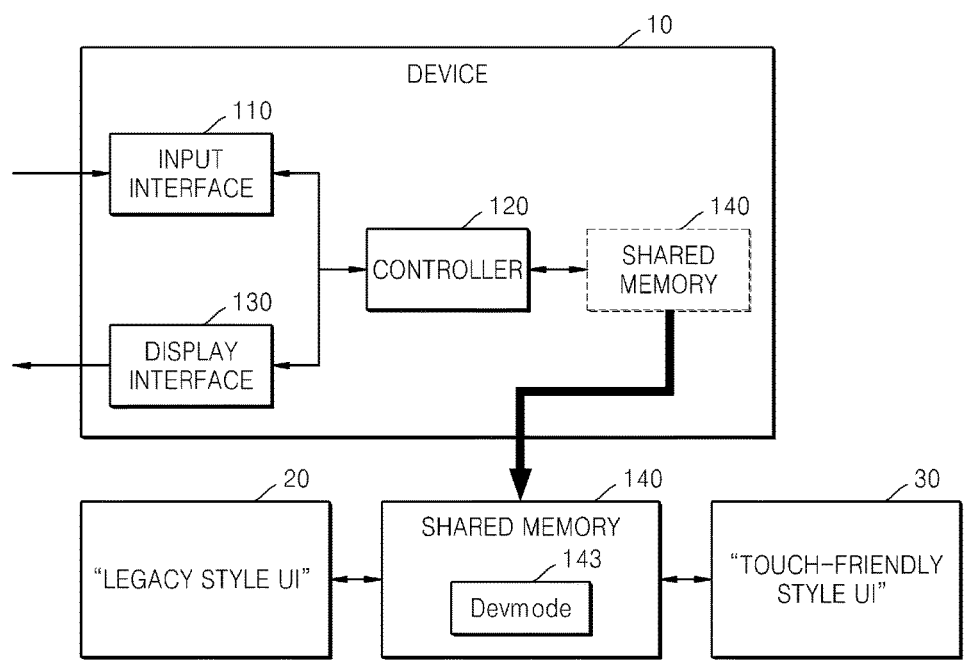
FIG. 5 is a block diagram illustrating a hardware structure of a device providing a UI screen, according to an embodiment.

The V4 printer driver supporting XPS does not require use of the shared memory 140 of FIG. 5 for sharing the DEVMODE because the printer driver information between the legacy style UI 20 and touch-friendly style UI 30 may be obtained by using PrintTicket in the same module of the V4 print subsystem.

Figure 4B:
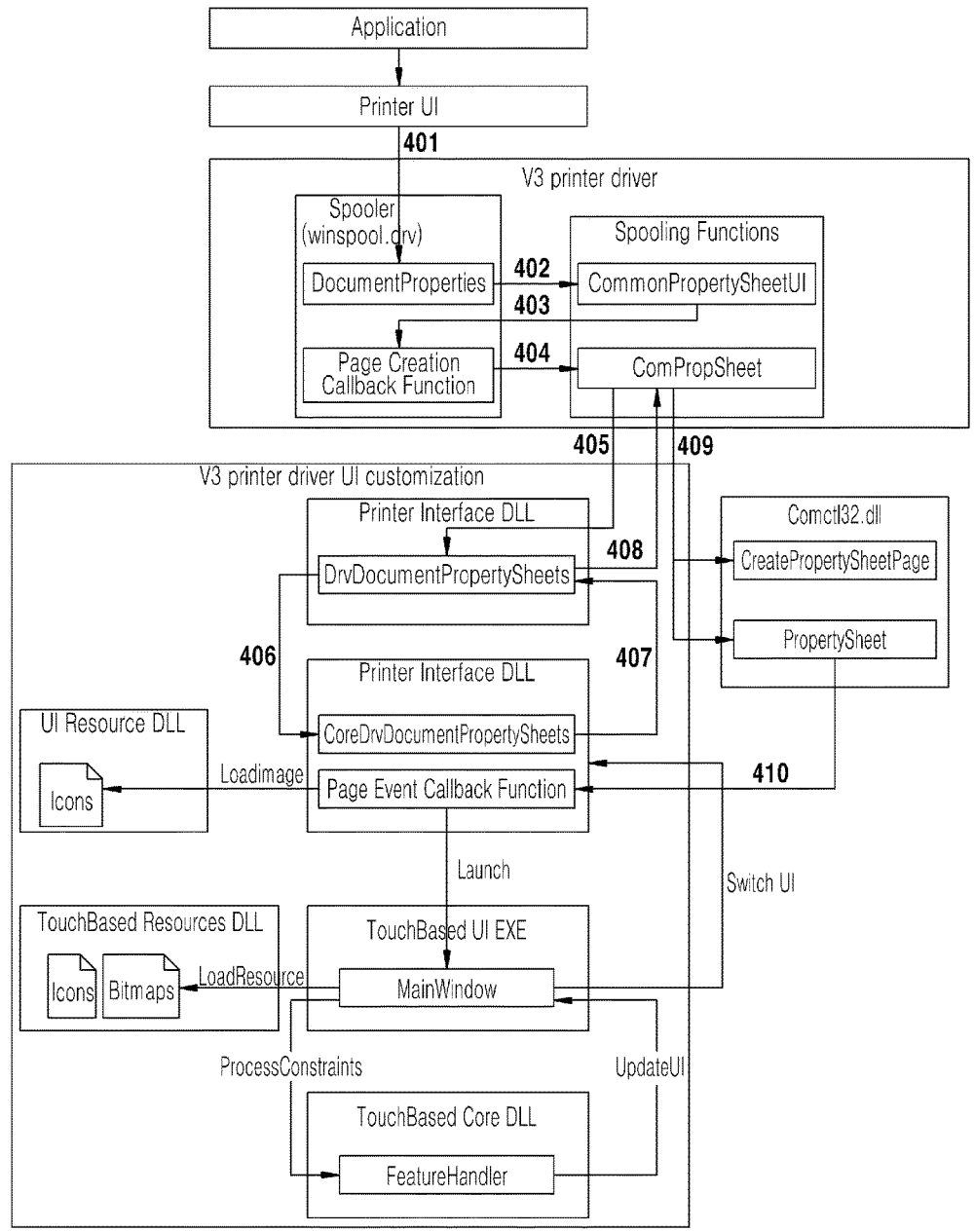
FIG. 4B is a block diagram illustrating an architecture of a V3 printer driver that is switchable to a display style corresponding to a type of an input, according to an embodiment.

FIG. 4B is a block diagram for describing an architecture of a V3 printer driver that is switchable to a display style corresponding to a type of an input, according to an embodiment.

When an application program installed in the OS issues a command to activate a printer driver UI for a print function, the V3 printer driver is executed.

Referring to operations 401 to 404, the V3 printer driver sequentially calls OS spooler callback functions.

Referring to operations 405 to 410, when the touch input 17 is received, the V3 printer driver calls functions of the TouchBased UI modules for the touch-friendly style UI 30 and thus the display style is switched from the legacy style UI 20 to the touch-friendly style UI 30. Reversely, when the cursor input 19 is received, the V3 printer driver calls a function, for example, UI Resources DLL, of a legacy UI module for the legacy style UI 20 and thus the display style is switched from touch-friendly style UI 30 to the legacy style UI 20.

Referring to FIG. 4B, "Spooler (winspool.drv)" and "Spooling Functions" are OS modules that are called up when an application program issues a command to open a printer driver UI.

"Comctl32.dll" is an OS module for performing common control of a printer driver UI of the V3 printer driver.

"Printer Interface DLL" is a customized module for a printer driver that is capable of switching between the legacy style UI 20 and the touch-friendly style UI 30 based on the type of the input according to the present embodiment and is a module for interfacing between the OS and the printer driver.

"Core UI DLL" is a customized module for the above-described printer driver according to the present embodiment and is a module for processing UI resource loading and a UI content event.

"UI Resources DLL" is a customized module for the above-described printer driver according to the present embodiment and is a module about legacy UI resources.

"TouchBased Resources DLL" is a customized module for the above-described printer driver according to the present embodiment and is a module about TouchBased UI resources.

"TouchBased UI EXE" is a customized module for the above-described printer driver according to the present embodiment and is an executable file (exe file) to launch the touch-friendly style UI 30.

"TouchBased Core DLL" is a customized module for the above-described printer driver according to the present embodiment and is a module for processing TouchBased UI resource loading and a UI control event.

Figure 4C:
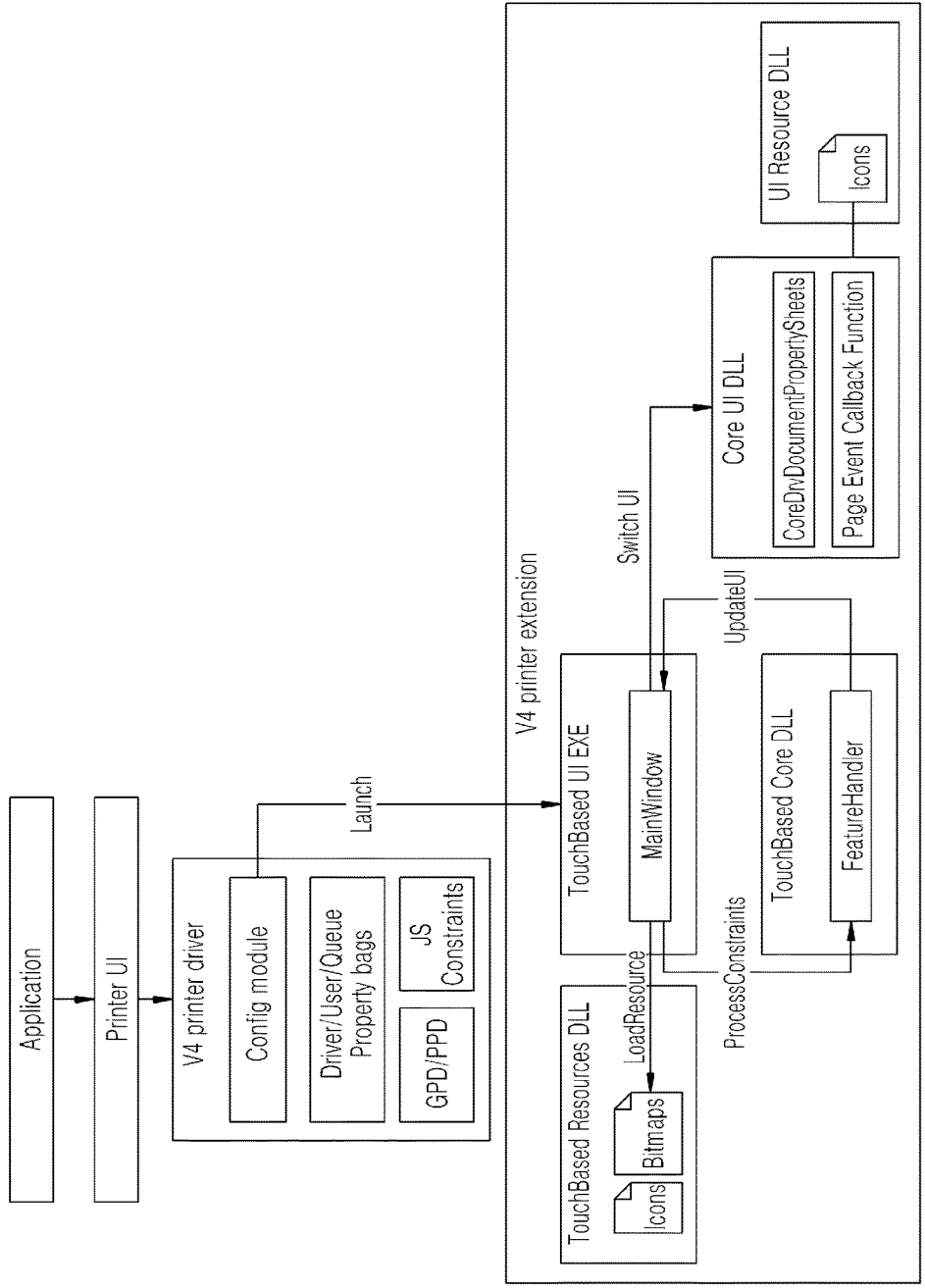
FIG. 4C is a block diagram illustrating an architecture of a V4 printer driver that is switchable to a display style corresponding to a type of an input, according to an embodiment.

FIG. 4C is a block diagram for describing an architecture of the V4 printer driver that is switchable to a display style corresponding to the type of an input, according to an embodiment.

When the touch input 17 is received after the legacy style UI 20 is displayed, the V4 printer driver, similarly to the V3 printer driver, calls functions of the TouchBased UI modules and switches the display style to the touch-friendly style UI 30. Reversely, when the cursor input 19 is received after the touch-friendly style UI 30 is displayed, the V4 printer driver, similarly to the V3 printer driver, calls functions of the legacy UI modules and switches the display style to the legacy style UI 20.

However, the architecture of the V4 printer driver, differently from the V3 printer driver, may not use the shared memory 140 of FIG. 5 because the V4 printer driver processes, within the same module area (V4 printer extension), the module about the legacy style UI 20 (UI Resources DLL) and the modules about the touch-friendly style UI 30 (TouchBased Resources DLL, TouchBased UI EXE, and TouchBased Core DLL).

Referring to FIG. 4C, "Config Module" is an OS module for executing TouchBased UI EXE according to setting information included in a package of the V4 printer driver.

"Driver/User/Queue Property bags", "GPD/PPD", and "JS Constraint" are customized modules for the above-described printer driver according to the present embodiment and are modules about printer driver setting information.

"UI Resources DLL" is a customized module for the above-described printer driver according to the present embodiment and a module about legacy UI resources.

"TouchBased Resources DLL" is a customized module for the above-described printer driver according to the present embodiment and is a module about TouchBased UI resources.

"TouchBased UI EXE" is a customized module for the above-described printer driver according to the present embodiment and is an executable file (exe file) to execute the touch-friendly style UI 30.

"TouchBased Core DLL" is a customized module for the above-described printer driver according to the present embodiment and is a module for processing TouchBased UI resource loading and a UI control event.

FIG. 5 is a block diagram illustrating a hardware structure of a device providing a UI screen, according to an embodiment.

The content described about the device 10 of FIG. 3 may identically apply to the device 10 of FIG. 5. Accordingly, descriptions about common constituent elements such as the input interface 110, the controller 120, and the display interface 130 are omitted herein.

The device 10 may further include the shared memory 140.

The shared memory 140 is a hardware structure for storing information that is to be processed or has already been processed in the device 10, particularly in the controller 120. For example, the shared memory 140 may store print setting information or UI information about a printer driver.

As described above with reference to FIGS. 4A and 4B, if the printer driver is the V3 printer driver, printer driver information (DEVMODE) 143 processed by the legacy style UI 20 and printer driver information (DEVMODE) 143 processed by touch-friendly style UI 30 may be shared by using the shared memory 140.

Figure 6:
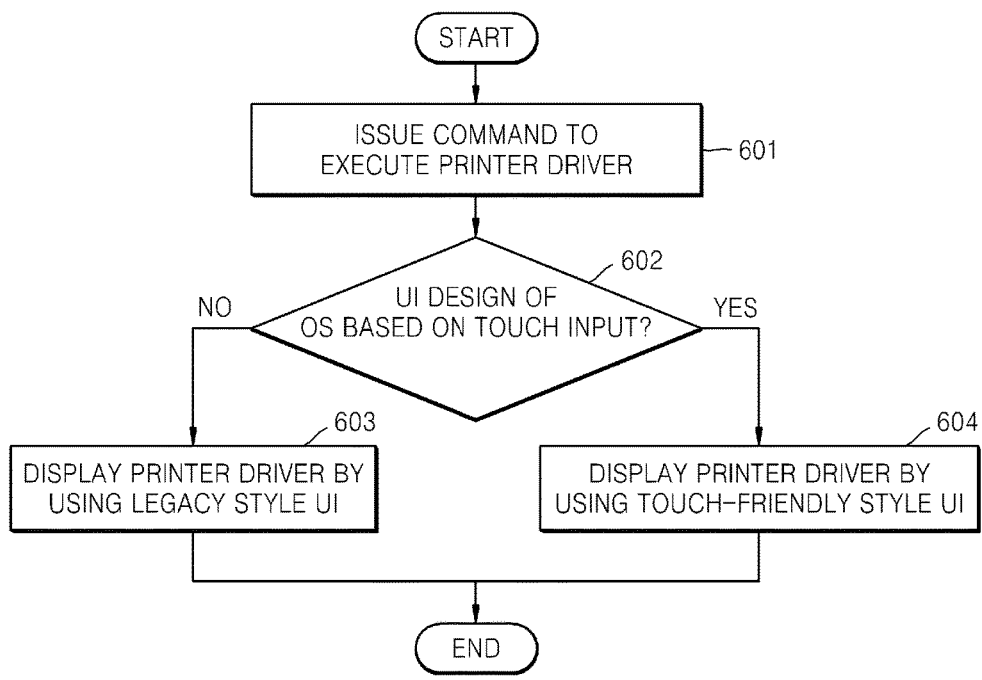
FIG. 6 is a flowchart illustrating a method of determining a display style of a printer driver UI to be displayed when a printer driver is first executed, according to an embodiment.

FIG. 6 is a flowchart for explaining a method of determining a display style of a printer driver UI to be displayed when a printer driver is first executed, according to an embodiment.

In operation 601, a user issues a command to execute a printer driver through the input interface 110 in order to start a print function in an application program.

In operation 602, the controller 120 determines whether a UI design of an OS is based on the touch input 17 or the cursor input 19. For example, assuming that the OS is one of the Windows 8 series, the controller 120 may determine that the UI design of an OS is based on the cursor input 19 if a current background is a classic or legacy UI design, and that the UI design of an OS is based on the touch input 17 if a current background is a touch-friendly UI design. However, the above description is a mere example for convenience of explanation and the present embodiment is not limited thereto.

In operation 603, if it is determined in the operation 602 that the UI design of an OS is based on the cursor input 19, a display style is determined to be the legacy style UI 20. The display interface 130 initially displays the printer driver UI by using the legacy style UI 20.

In operation 604, if it is determined in the operation 602 that the US design of an OS is based on the touch input 17, it is determined that a display style is the touch-friendly style UI 30. The display interface 130 initially displays the printer driver by using the touch-friendly style UI 30.

In other words, referring to FIG. 6, the display interface 130 may display the printer driver UI with a default style depending on the current UI design of an OS. Assuming that the OS is one of Windows 8 series, the default style may be the legacy style UI 20 if the current UI design of an OS is a classic or legacy UI design, and may be the touch-friendly style UI 30 if the current UI design of an OS is a touch-friendly UI design.

However, the default style according to the present embodiment is not limited to the UI design of an OS as described above with reference to FIG. 6, and may be a predetermined display style. In other words, the user may previously set a default style regardless of the UI design of an OS, or a display style of a default style that is previously set by the user may be displayed when a printer driver is executed.

Figure 7A:
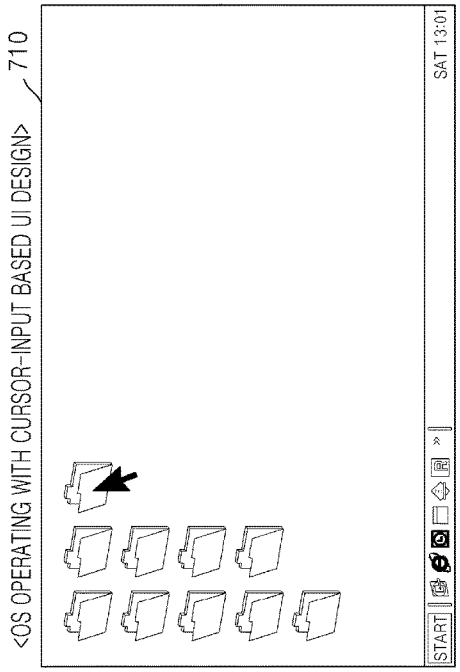
FIG. 7A illustrates a display style of a printer driver UI to be display when a printer driver is executed on an operating system (OS) operating with a cursor-input based UI design, according to an embodiment.
Figure 7A:
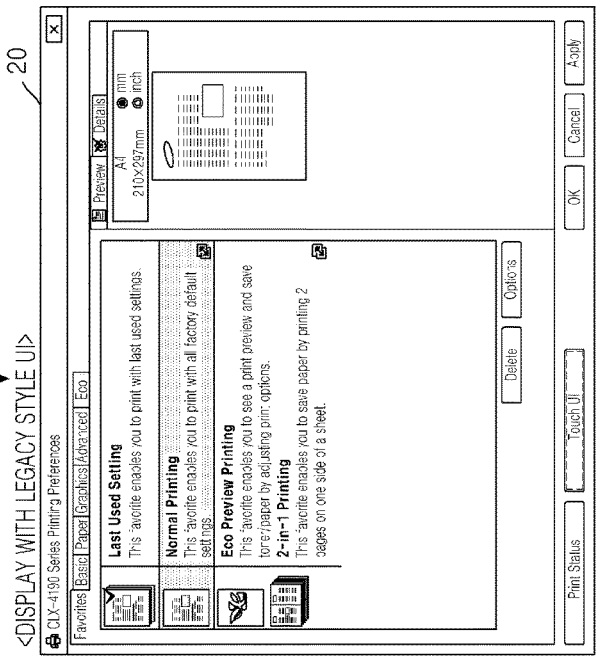

FIG. 7A is a view for describing a display style of a printer driver UI to be displayed when a printer driver is executed in an OS operating according to a cursor-input based UI design 710, according to an embodiment.

Referring to FIG. 7A, when a printer driver is executed in an application program while an OS is being operating according to a background of a classic or legacy UI design based on the cursor input 19, the printer driver may be displayed in a display style of the legacy style UI 20 depending on the classic or legacy UI design of the OS.

Figure 7B:
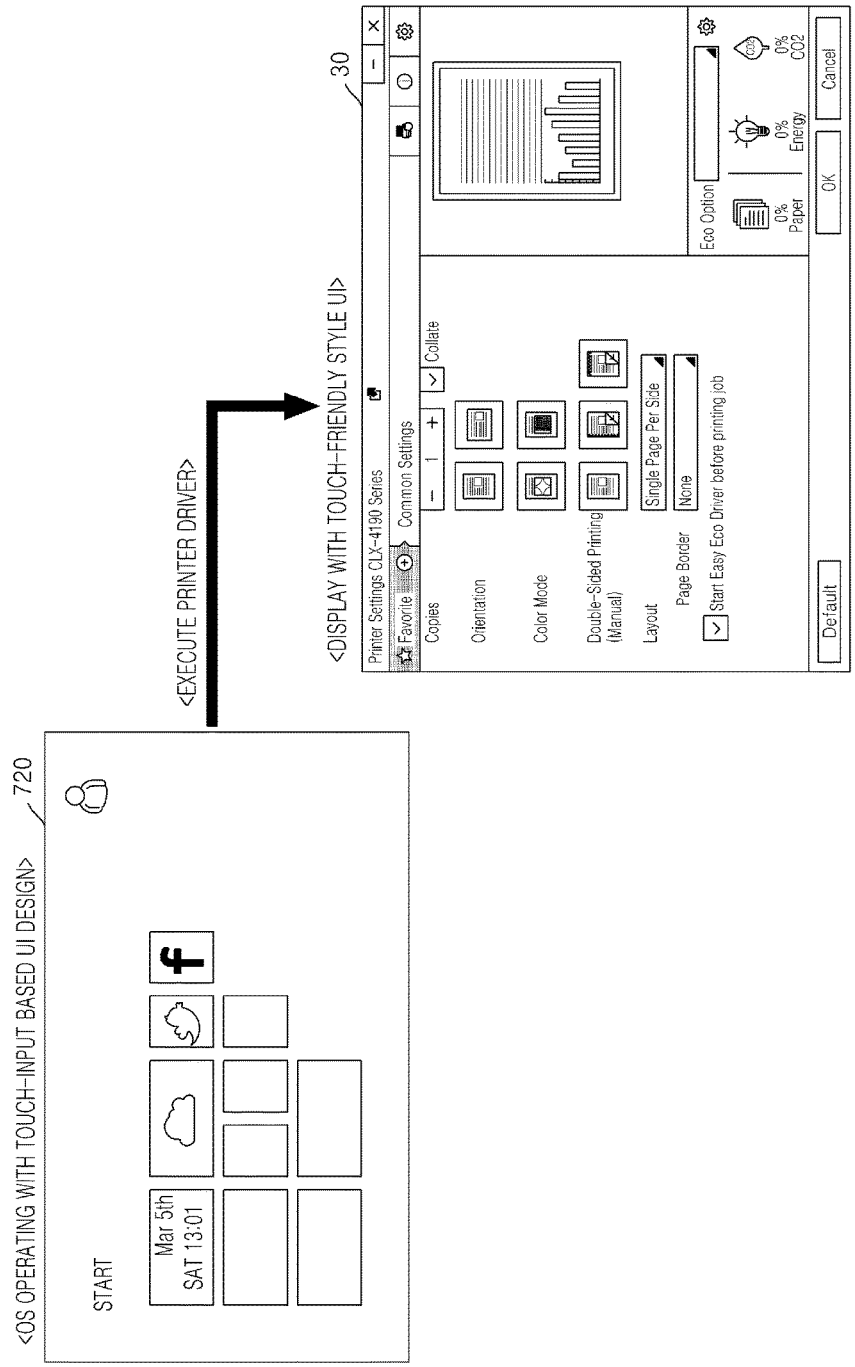
FIG. 7B illustrates a display style of a printer driver UI to be display when a printer driver is executed on an OS operating with a touch-input based UI design, according to an embodiment.

FIG. 7B is a view for describing a display style of a printer driver UI to be displayed when a printer driver is executed on an OS operating according to a touch-input based UI design 720, according to an embodiment.

Referring to FIG. 7B, when a printer driver is executed in an application program while an OS is being operating according to a background of a touch-friendly UI design based on the touch input 17, the printer driver may be displayed in a display style of the touch-friendly style UI 30 depending on the touch-friendly UI design of the OS.

However, regardless of the UI design of an OS, the printer driver UI may be displayed in a display style that is previously set by a user.

Figure 8:
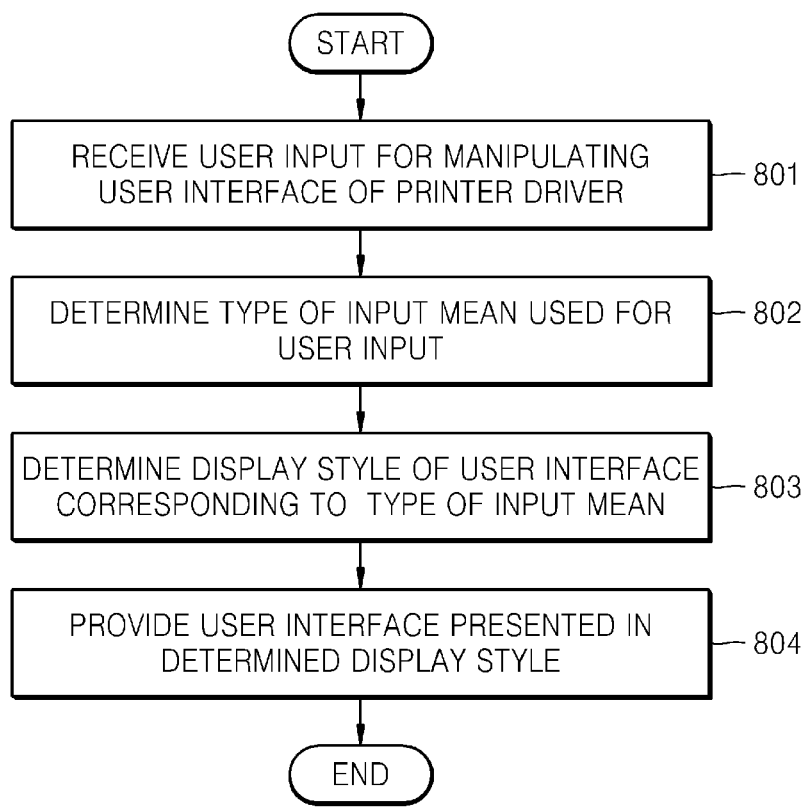
FIG. 8 is a flowchart illustrating a method of providing a UI screen in a device, according to an embodiment.

FIG. 8 is a flowchart for explaining a method of providing a UI screen in a device, according to an embodiment. Because the UI screen providing method of FIG. 8 includes operations that are time-serially processed in the device 10 shown in FIGS. 1A to 7, the content described with reference to FIGS. 1A to 7 may apply to the UI screen providing method of FIG. 8, even if the content is omitted here.

In operation 801, the input interface 110 receives a user input for manipulating a UI of a printer driver. The user input may include the touch input 17 and the cursor input 19.

In operation 802, the controller 120 determines the type of an input used for the user input received through the input interface 110. In other words, the controller 120 may determine that the input is the touch input 17 when a contact of the touch screen 13 is detected through the input interface 110 or the cursor input 19 when a click of the mouse 16 is detected through the input interface 110. Also, the controller 120 may determine that the input is the touch screen 13 when the touch input 17 is detected through the input interface 110 or the mouse 16 when the cursor input 19 is detected through the input interface 110.

In operation 803, the controller 120 determines a display style of a UI corresponding to the determined type of the input. In other words, when the determined type of the input is the cursor input 19 or the mouse 16, the controller 120 may determine that the display style is the legacy style 20 corresponding to the cursor input 19 or the mouse 16. Alternatively, when the determined type of the input is the touch input 17 or the touch screen 13, the controller 120 may determine that the display style is the touch-friendly style UI 30 corresponding to the touch input 17 or the touch screen 13.

In operation 804, the display interface 130 provides a printer driver UI presented in the display style determined by the controller 120. In other words, the display interface 130 may display the legacy style UI 20 or the touch-friendly style UI 30. In doing so, the display interface 130 may switch the legacy style UI 20 to the touch-friendly style UI 30 or vice versa.

Figure 9:
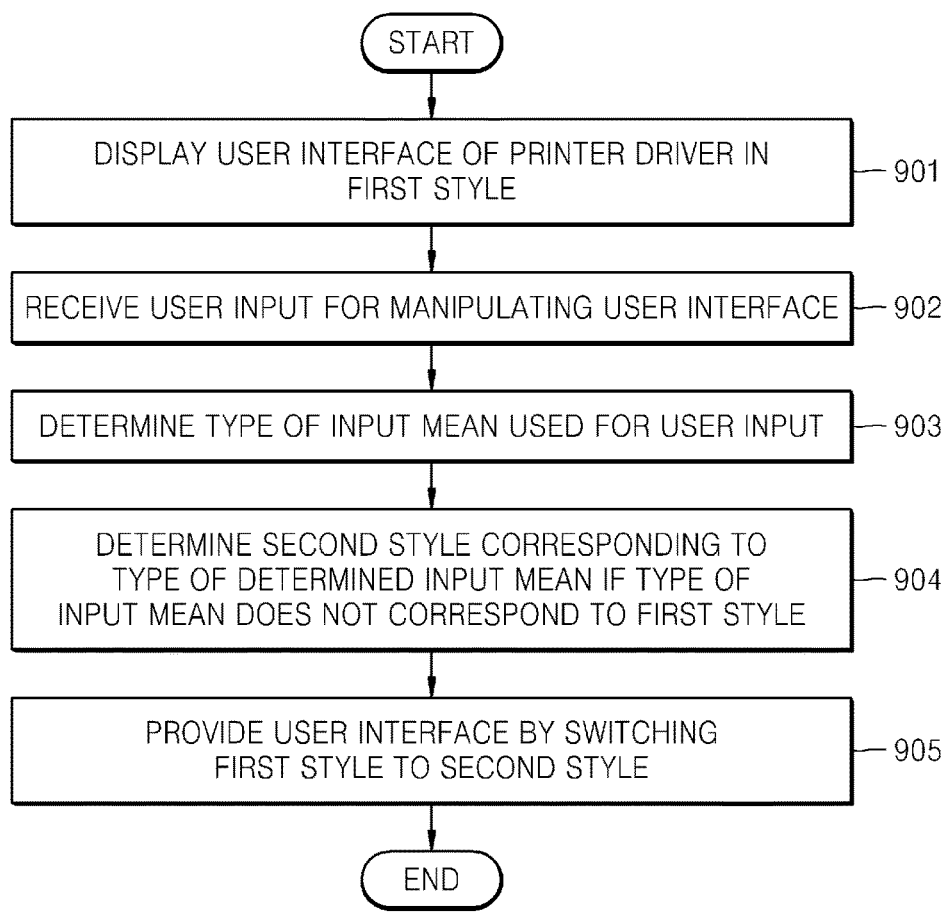
FIG. 9 is a flowchart illustrating a method of providing a UI screen in a device, according to an embodiment.

FIG. 9 is a flowchart for explaining a method of providing a UI screen in a device, according to an embodiment. Because the UI screen providing method of FIG. 9 includes operations that are time-serially processed in the device 10 shown in FIGS. 1A to 7, the content described with reference to FIGS. 1A to 7 may apply to the UI screen providing method of FIG. 9, even if the content is omitted here.

In operation 901, the display interface 130 displays in a first style a UI corresponding to a printer driver. When the first style is the legacy style UI 20 in FIG. 9, a second style below is the touch-friendly style UI 30. Reversely, when the first style is the touch-friendly style UI 30, the second style below is the legacy style UI 20.

In operation 902, the input interface 110 receives a user input for manipulating the UI of a printer driver. The user input may include the touch input 17 and the cursor input 19.

In operation 903, the controller 120 determines the type of an input used for a user input received through the input interface 110.

In operation 904, if the type of an input does not correspond to the first style, the controller 120 determines the second style corresponding to the determined type of the input. In other words, if the determined type of the input is the touch input 17 while a current printer driver UI is the legacy style UI 20, the controller 120 may determine that the display style is the touch-friendly style UI 30 such that the legacy style UI 20 is switched to the touch-friendly style UI 30. Also, if the determined type of the input is the cursor input 19 while a current printer driver UI is the touch-friendly style UI 30, the controller 120 may determine that the display style is the legacy style UI 20 such that the touch-friendly style UI 30 is switched to the legacy style UI 20.

In operation 905, the display interface 130 provides the printer driver UI by switching the first style to the determined second style.

Figure 10A:
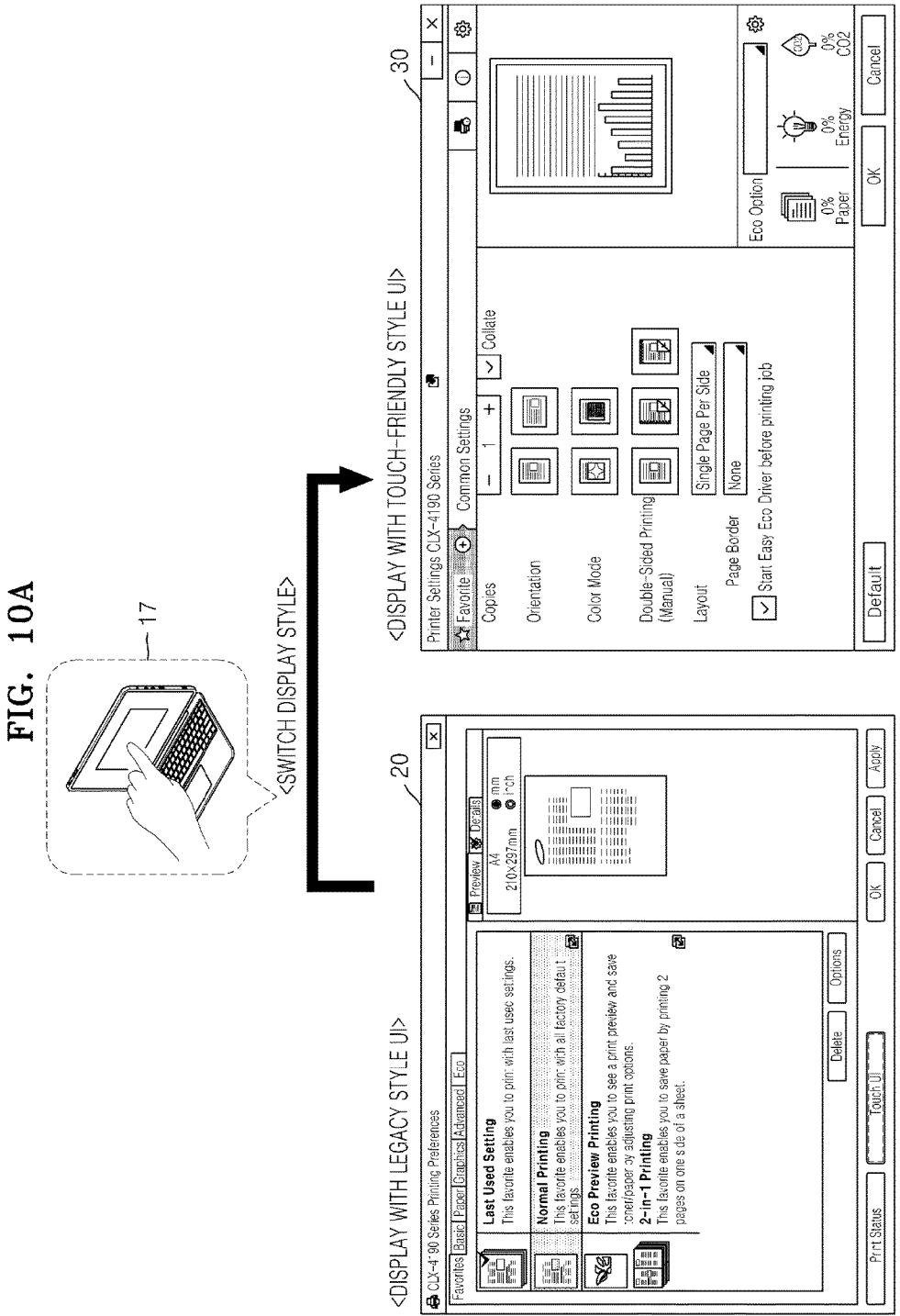
FIG. 10A illustrates switching of a display style of a printer driver UI according to a touch input, according to an embodiment.

FIG. 10A is a view for describing switching of a display style of a printer driver UI according to a touch input, according to an embodiment.

Referring to FIG. 10A, when a user manipulates a certain point in the legacy style UI 20 through the touch input 17 in a state in which a printer driver UI is displayed by using the legacy style UI 20, the display interface 130 displays the print driver UI by switching the legacy style UI 20 that is a current UI to the touch-friendly style UI 30 corresponding to the touch input 17.

FIG. 10B is a view for describing switching of a display style of a printer driver UI according to a cursor input, according to an embodiment.

Referring to FIG. 10B, when a user manipulates a certain point in the touch-friendly style UI 30 through the cursor input 19 in a state in which a printer driver is displayed by using the touch-friendly style UI 30, the display interface 130 displays the print driver UI by switching the touch-friendly style UI 30 that is a current UI to the legacy style UI 20 corresponding to the cursor input 19.

Figure 11:
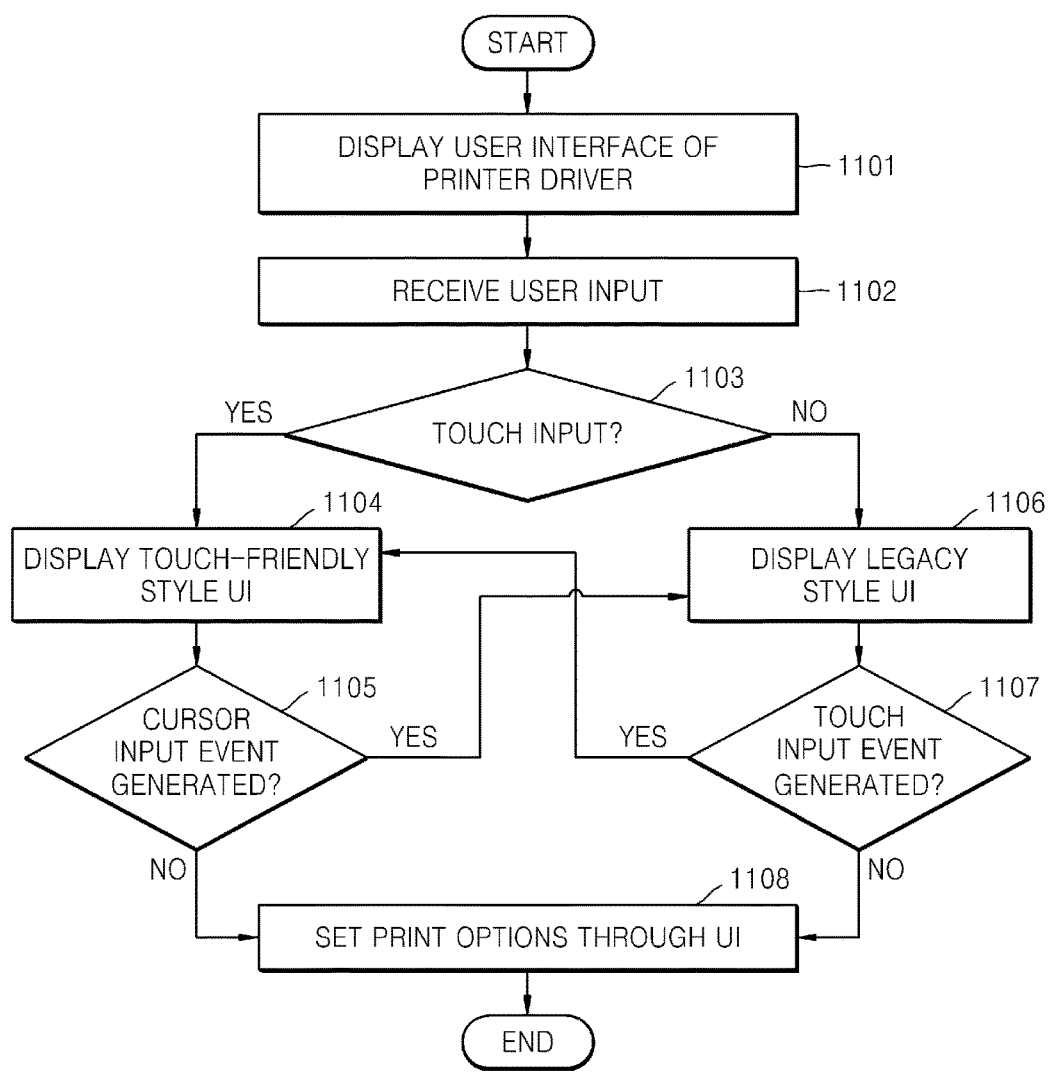
FIG. 11 is a flowchart illustrating in detail the UI providing method described with reference to FIG. 8 or 9.

FIG. 11 is a flowchart for explaining in detail the UI providing method described with reference to FIG. 8 or 9.

In operation 1101, the display interface 130 displays a UI corresponding to a printer driver.

In operation 1102, the input interface 110 receives a user input for manipulating the UI corresponding to a printer driver. The user input may include the touch input 17 and the cursor input 19.

In operation 1103, the controller 120 determines the type of an input used for a user input received through the input interface 110. In other words, the controller 120 may determine whether the touch input 17 or the cursor input 19 is received. Also, the controller 120 may determine whether the input is received through the touch screen 13 or the mouse 16 (the touch pad 15, etc.).

If the controller 120 determines that the input is received through the touch input 17 or the touch screen 13, operation 1104 is performed. If the controller 120 determines that the input is received through the cursor input 19 or the mouse 16 (the touch pad 15, etc.), operation 1106 is performed.

In the operation 1104, the display interface 130 displays the touch-friendly style UI 30 corresponding to the input such as the touch input 17 or the touch screen 13.

In operation 1105, the controller 120 determines whether an event of the cursor input 19 is newly generated after the touch-friendly style UI 30 is displayed. If an event of the cursor input 19 is newly generated after the touch-friendly style UI 30 is displayed, the controller 120 performs the operation 1106.

In the operation 1106, the display interface 130 displays the legacy style UI 20 corresponding to the input such as the cursor input 19 or the mouse 16 (the touch pad 15, etc.).

In operation 1107, the controller 120 determines whether an event of the touch input 17 is newly generated after the legacy style UI 20 is displayed. If an event of the touch input 17 is newly generated after the legacy style UI 20 is displayed, the controller 120 performs the operation 1104.

In operation 1108, the controller 120 sets print options input by the user through the touch-friendly style UI 30 or the legacy style UI 20.

Figure 12A:
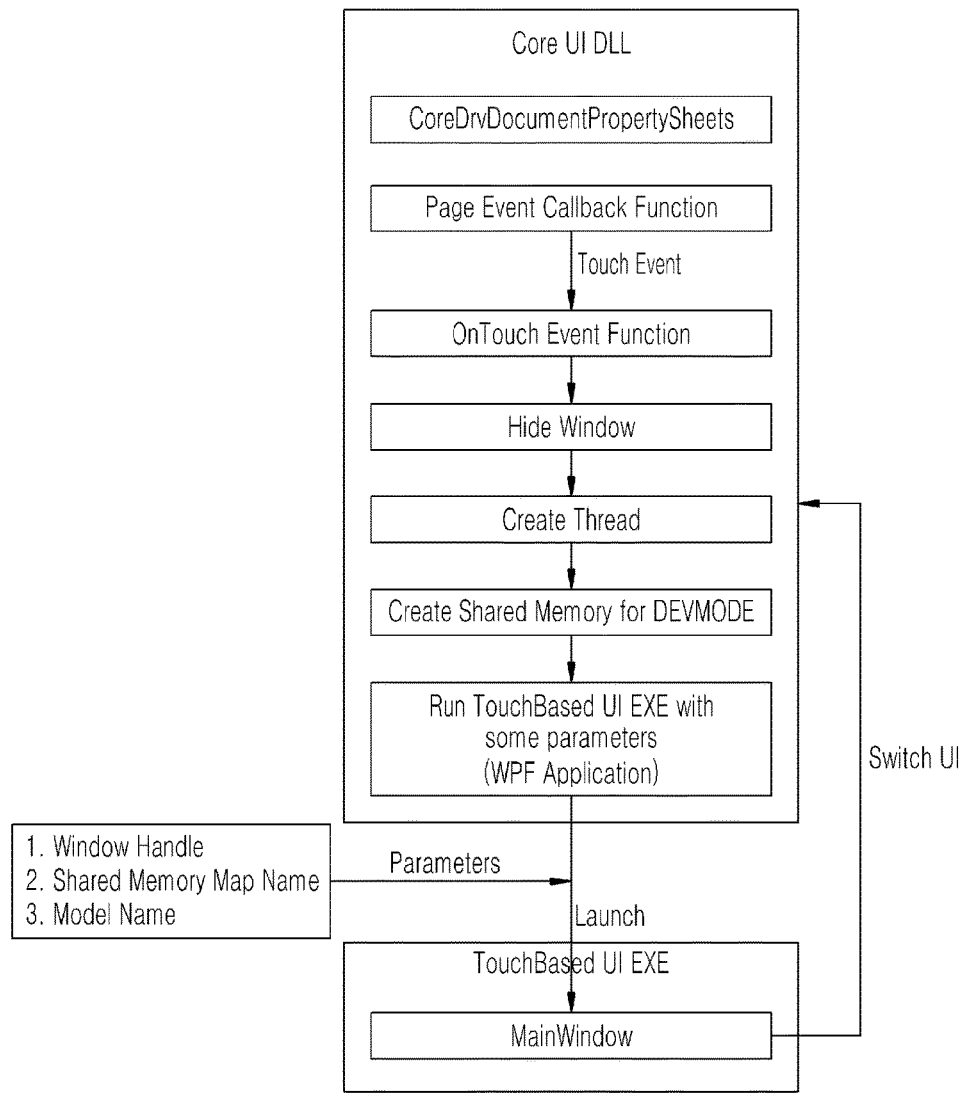
FIG. 12A illustrates an architecture of a V3 printer driver to switch a display style from a legacy style UI to a touch-friendly style UI, according to an embodiment.

FIG. 12A is a view for describing an architecture of the V3 printer driver to switch a display style from the legacy style UI to the touch-friendly style UI, according to an embodiment.

Referring to FIG. 12A, when an event of the touch input 17 is generated in a state in which the legacy style UI 20 is displayed, the Core UI DLL creates a thread (Create Thread) after hiding the legacy style UI 20 (Hide Window). Next, the Core UI DLL creates a shared memory 140 for printer driver information (DEVMODE) about the legacy style UI 20 (Create Shared Memory for DEVMODE). The Core UI DLL transfers to the module TouchBased UI a handle/model name of a window of the legacy style UI 20 that is a current UI, as a parameter. Next, as the file TouchBased UI EXE is launched, the display style is switched to the touch-friendly style UI 30.

Figure 12B:
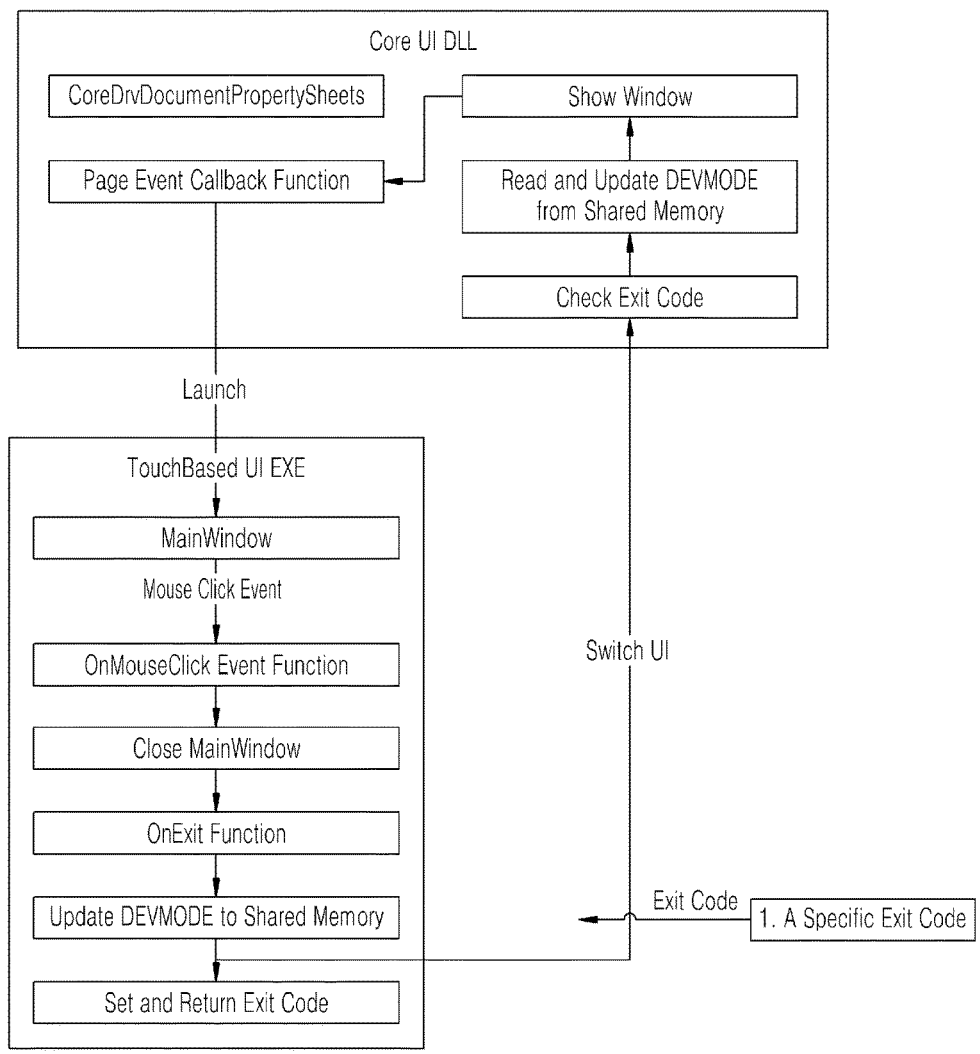
FIG. 12B illustrates an architecture of a V3 printer driver to switch a display style from a touch-friendly style UI to a legacy style UI, according to an embodiment.

FIG. 12B is a view for describing an architecture of the V3 printer driver to switch a display style from the touch-friendly style UI to the legacy style UI, according to an embodiment.

Referring to FIG. 12B, when an event of the cursor input 19 is generated in a state in which the touch-friendly style UI 30 is displayed, the TouchBased UI EXE closes the touch-friendly style UI 30 (Close MainWindow). Then, the TouchBased UI EXE updates the printer driver information (DEVMODE) in the shared memory 140. The TouchBased UI EXE transfers a specific exit code (Specific Exit Code) to the legacy UI module. The Core UI DLL checks a transferred exit code (Check Exit Code) and reads the DEVMODE from the shared memory 140 (Read and Update DEVMODE from Shared Memory). The Core UI DLL executes the legacy UI again to display the legacy style UI 20 that have been hidden (Show Window).

Figure 13A:
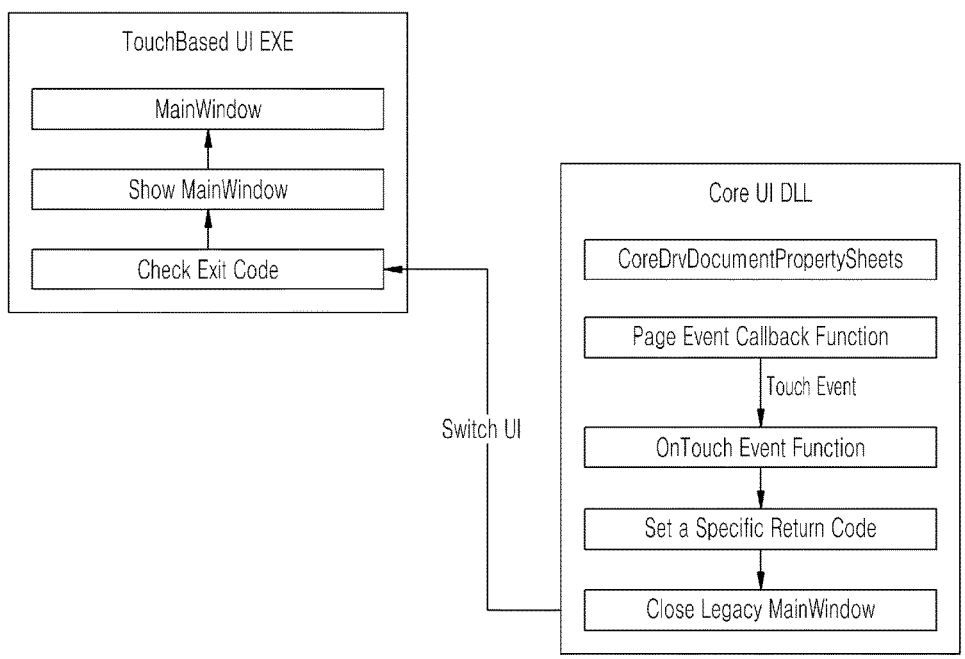
FIG. 13A illustrates an architecture of a V4 printer driver to switch a display style from a legacy style UI to a touch-friendly style UI, according to an embodiment.

FIG. 13A is a view for describing an architecture of the V4 printer driver to switch a display style from the legacy style UI to the touch-friendly style UI, according to an embodiment.

Referring to FIG. 13A, when an event of the touch input 17 is generated in a state in which the legacy style UI 20 is displayed, the Core UI DLL sets a specific code (Set a Specific Return Code) and then closes the legacy style UI 20 (Close Legacy MainWindow). The TouchBased UI EXE checks the exit code transferred from the Core UI DLL (Check Exit Code) and then displays the touch-friendly style UI 30 (Show MainWindow).

Figure 13B:
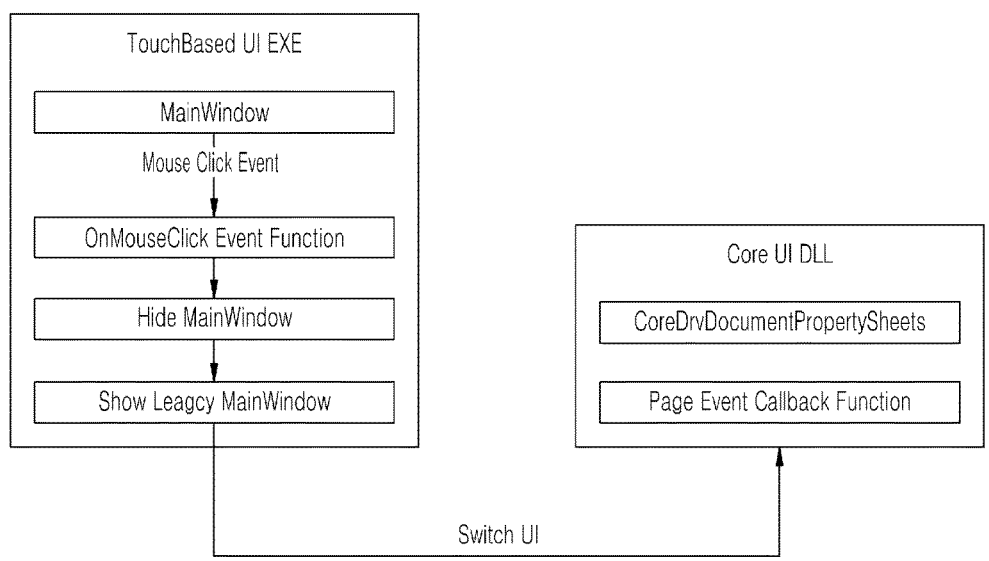
FIG. 13B illustrates an architecture of a V4 printer driver to switch a display style from a touch-friendly style UI to a legacy style UI, according to an embodiment.

FIG. 13B is a view for describing an architecture of the V4 printer driver to switch a display style from the touch-friendly style UI to the legacy style UI, according to an embodiment.

Referring to FIG. 13B, when an event of the cursor input 10 is generated in a state in which the touch-friendly style UI 30 is displayed as the TouchBased UI EXE is launched, the touch-friendly style UI 30 is hidden and then the display style is switched to the legacy style UI 20.

For reference, as described above, because the architecture of the V4 printer driver is different from the architecture of the V3 printer driver, the switching of a display style by the V4 printer driver may be faster than that of the V3 printer driver.

Figure 14A:
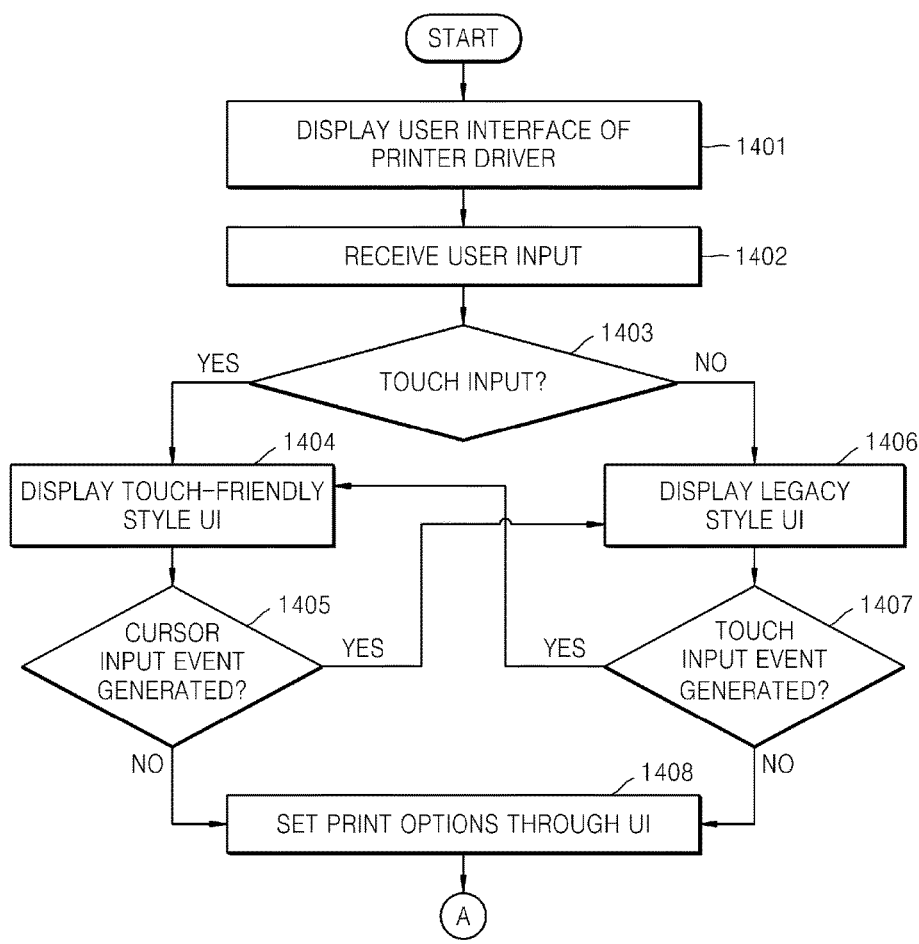
FIGS. 14A and 14B show a flowchart illustrating a method of providing a UI screen, according to an embodiment.
Figure 14B:
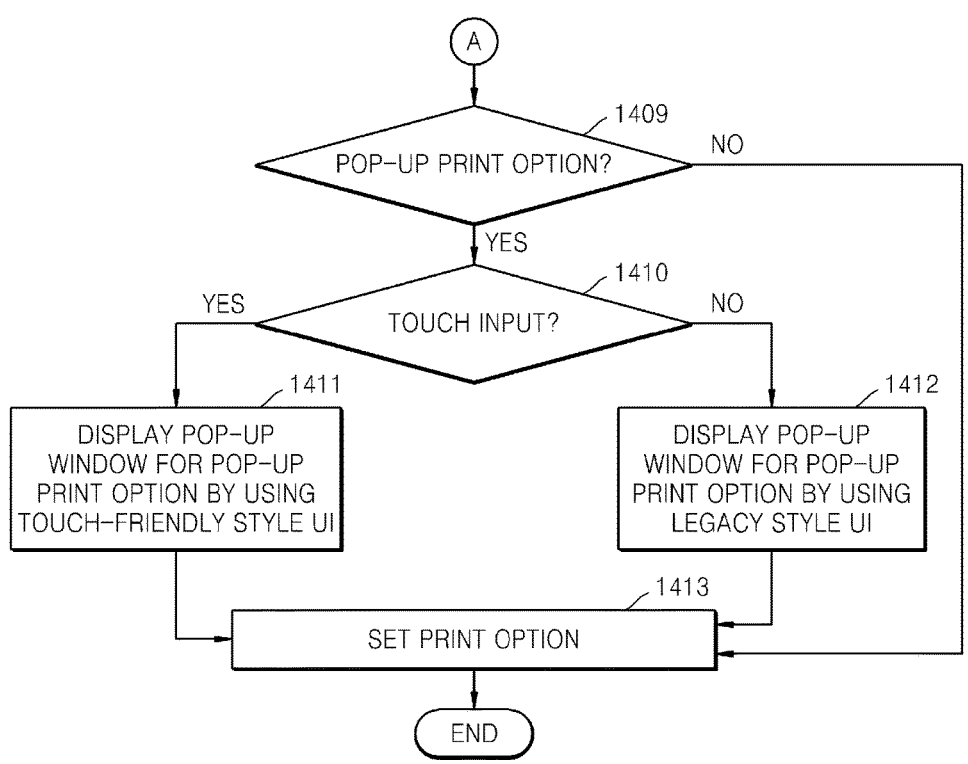

FIGS. 14A and 14B show a flowchart for explaining a method of providing a UI screen, according to an embodiment.

The method of FIGS. 14A and 14B relates to a method of switching only a UI of a pop-up window for specific print options selected by a user without switching the entire printer driver UI.

In operation 1401, the display interface 130 displays a UI of a printer driver.

In operation 1402, the input interface 110 receives a user input for manipulating the UI corresponding to a printer driver. The user input may include the touch input 17 and the cursor input 19.

In operation 1403, the controller 120 determines the type of an input used for a user input received through the input interface 110. In other words, the controller 120 may determine whether the touch input 17 or the cursor input 19 is received. Also, the controller 120 may determine whether the input is received through the touch screen 13 or the mouse 16 (the touch pad 15, etc.).

If the controller 120 determines that the input is received through the touch input 17 or the touch screen 13, operation 1404 is performed. If the controller 120 determines that the input is received through the cursor input 19 or the mouse 16 (the touch pad 15, etc.), operation 1406 is performed.

In the operation 1404, the display interface 130 displays the touch-friendly style UI 30 corresponding to the input such as the touch input 17 or the touch screen 13.

In operation 1405, the controller 120 determines whether an event of the cursor input 19 is newly generated after the touch-friendly style UI 30 is displayed. If an event of the cursor input 19 is newly generated after the touch-friendly style UI 30 is displayed, the controller 120 performs the operation 1406.

In the operation 1406, the display interface 130 displays the legacy style UI 20 corresponding to the input such as the cursor input 19 or the mouse 16 (the touch pad 15, etc.).

In operation 1407, the controller 120 determines whether an event of the touch input 17 is newly generated after the legacy style UI 20 is displayed. If an event of the touch input 17 is newly generated after the legacy style UI 20 is displayed, the controller 120 performs the operation 1404.

In operation 1408, a user selects a print option through the touch-friendly style UI 30 or the legacy style UI 20 and the controller 120 activates the print option selected by the user.

In operation 1409, the controller 120 determines whether the print option selected by the user is a pop-up print option. The pop-up print option may be a print option displayed on a new pop-up window when selected by the user. The pop-up print option may include a print option that requires switching of a UI when the type of an input is changed.

If the pop-up print option is selected, the controller 120 performs operation 1410. Otherwise, the controller performs operation 1413.

In the operation 1410, the controller 120 determines the type of an input used for the selection of a pop-up print option. In other words, the controller 120 determines whether the pop-up print option is selected by the touch input 17 or the cursor input 19. If the pop-up print option is selected by the touch input 17, the controller 120 performs operation 1411. If the pop-up print option is selected by the cursor input 19, the controller 120 performs operation 1412.

In operation 1411, the display interface 130 displays the pop-up window for the pop-up print option by using the touch-friendly style UI 30. In doing so, the display interface 130 displays only the pop-up window by using the touch-friendly style UI 30 and the original printer driver UI by using the legacy style UI 20.

In operation 1412, the display interface 130 displays the pop-up window for the pop-up print option by using the legacy style UI 20. In doing so, the display interface 130 displays only the pop-up window by using the legacy style UI 20 and the original printer driver UI by using the touch-friendly style UI 30.

In operation 1413, the controller 120 sets option information input by the user with respect to the pop-up print option displayed through the pop-up window. Also, if the option information is not with respect to the pop-up print option, the controller 120 sets the option information input by the user with respect to the print option.

Figure 15:
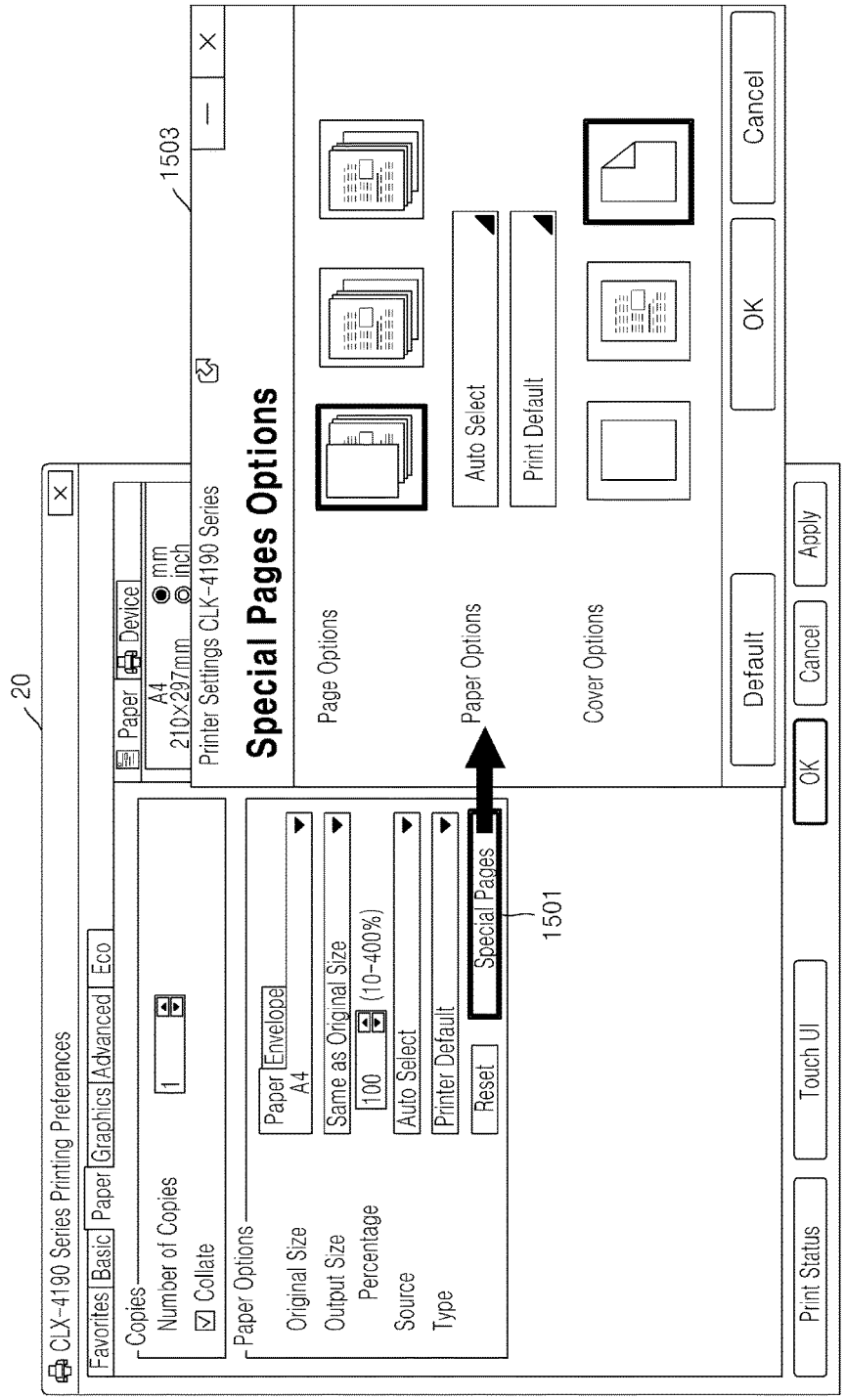
FIG. 15 illustrates switching of the UI of a pop-up print option to correspond to the type of an input, according to an embodiment.

FIG. 15 is a view for describing switching of the UI of a pop-up print option to correspond to the type of an input, according to an embodiment.

Referring to FIG. 15, it is assumed that the legacy style UI 20 is displayed in the display interface 130. A pop-up print option 1501 for Special Pages may be displayed on the legacy style UI 20 corresponding to the printer driver.

If the pop-up print option 1501 is selected by a user through the touch input 17, the display interface 130 displays a pop-up window 1503 for detailed options of a subclass of the Special Pages by using the touch-friendly style UI 30.

In other words, the display style of the pop-up window 1503 for detailed options of a subclass of the pop-up print option 1501 may be switched according to the type of an input such as the touch input 17 or the cursor input 19.

Figure 16A:
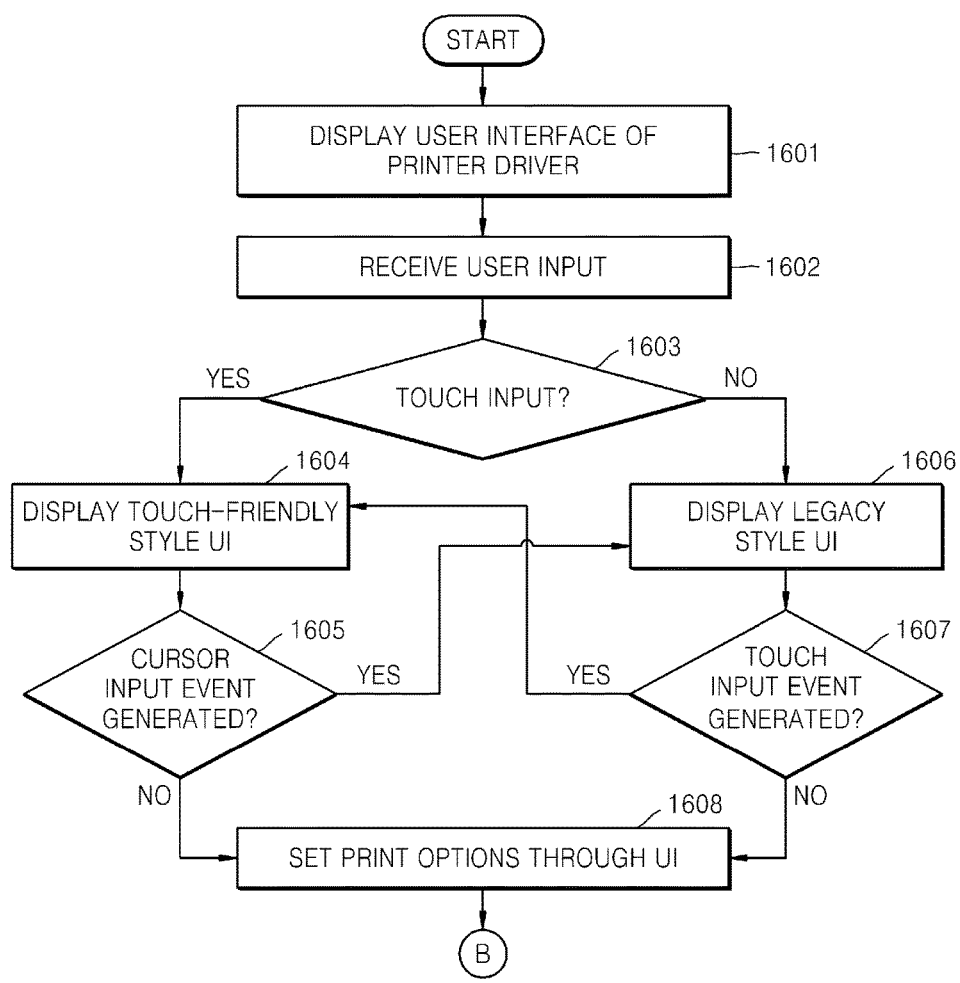
FIGS. 16A and 16B show a flowchart illustrating a method of providing a UI screen, according to an embodiment.
Figure 16B:
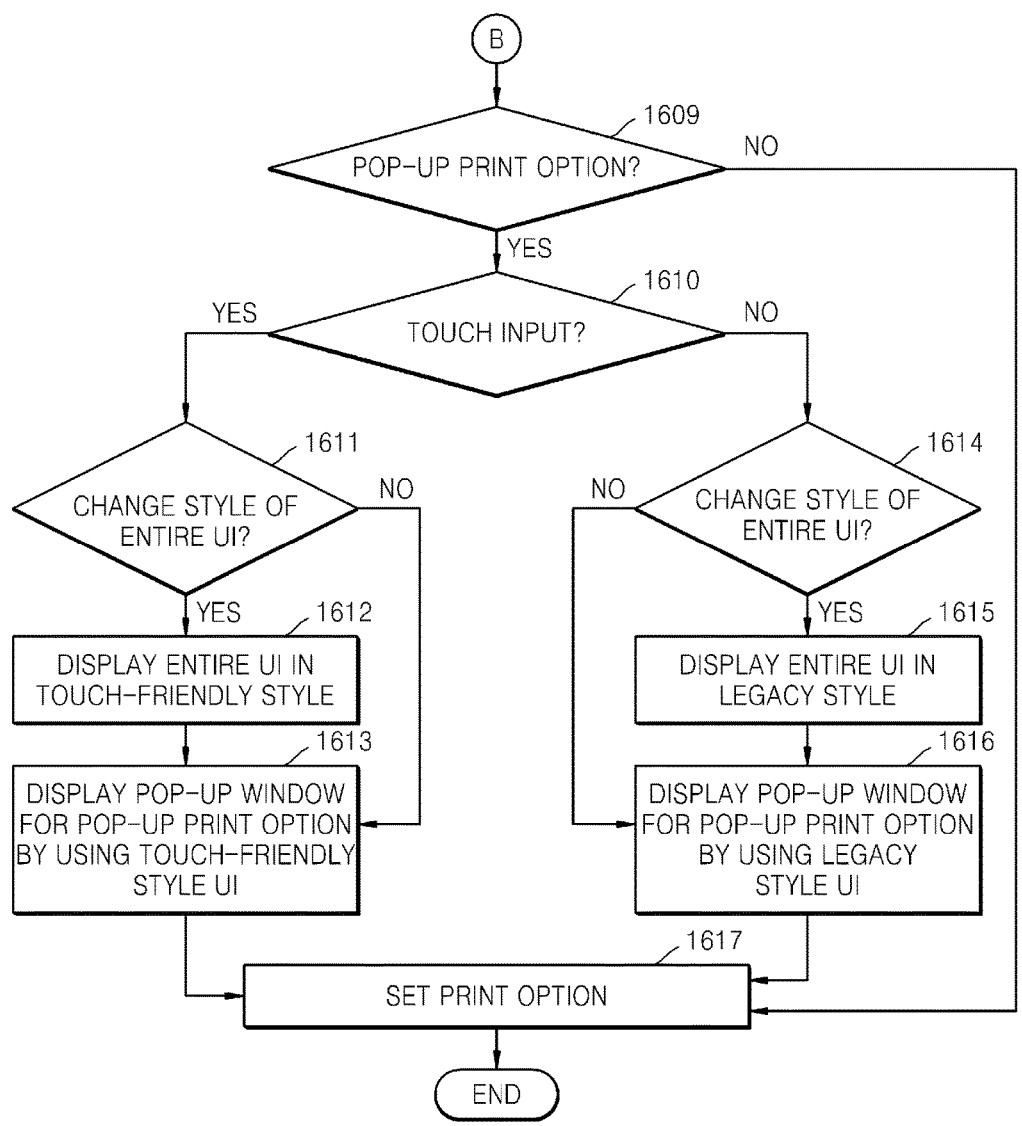

FIGS. 16A and 16B show a flowchart for explaining a method of providing a UI screen, according to an embodiment.

The method of FIGS. 16A and 16B relates to a method of simultaneously switching a display style of the entire printer driver UI and a display style of a pop-up window.

In operation 1601, the display interface 130 displays a UI corresponding to a printer driver.

In operation 1602, the input interface 110 receives a user input for manipulating the UI of a printer driver. The user input may include the touch input 17 and the cursor input 19.

In operation 1603, the controller 120 determines the type of an input used for a user input received through the input interface 110. In other words, the controller 120 may determine whether the touch input 17 or the cursor input 19 is received. Also, the controller 120 may determine whether the input is received through the touch screen 13 or the mouse 16 (the touch pad 15, etc.).

If the controller 120 determines that the input is received through the touch input 17 or the touch screen 13, operation 1604 is performed. If the controller 120 determines that the input is received through the cursor input 19 or the mouse 16 (the touch pad 15, etc.), operation 1606 is performed.

In the operation 1604, the display interface 130 displays the touch-friendly style UI 30 corresponding to the input such as the touch input 17 or the touch screen 13.

In operation 1605, the controller 120 determines whether an event of the cursor input 19 is newly generated after the touch-friendly style UI 30 is displayed. If an event of the cursor input 19 is newly generated after the touch-friendly style UI 30 is displayed, the controller 120 performs the operation 1606.

In the operation 1606, the display interface 130 displays the legacy style UI 20 corresponding to the input such as the cursor input 19 or the mouse 16 (the touch pad 15, etc.).

In operation 1607, the controller 120 determines whether an event of the touch input 17 is newly generated after the legacy style UI 20 is displayed. If an event of the touch input 17 is newly generated after the legacy style UI 20 is displayed, the controller 120 performs the operation 1604.

In operation 1608, a user selects a print option through the touch-friendly style UI 30 or the legacy style UI 20. The controller 120 activates the print option selected by the user.

In operation 1609, the controller 120 determines whether the print option selected by the user is a pop-up print option.

If the pop-up print option is selected, the controller 120 performs operation 1610. Otherwise, the controller performs operation 1617.

In the operation 1610, the controller 120 determines the type of an input used for the selection of a pop-up print option. In other words, the controller 120 determines whether the pop-up print option is selected by the touch input 17 or the cursor input 19. If the pop-up print option is selected by the touch input 17, the controller 120 performs operation 1611. If the pop-up print option is selected by the cursor input 19, the controller 120 performs operation 1614.

In operation 1611, the controller 120 determines whether to change a display style of the entire printer driver UI. In doing so, the display interface 130 may additionally display a dialog window for inquiring whether to change a display style of the entire printer driver UI. The user may select whether to change a display style of the entire printer driver UI through the displayed dialog window.

If a display style of the entire printer driver UI is changed, operation 1612 is performed. Otherwise, operation 1613 is performed.

In the operation 1612, the display interface 130 displays the entire printer driver UI by using the touch-friendly style UI 30.

In the operation 1613, the display interface 130 displays a pop-up window for the pop-up print option by using the touch-friendly style UI 30.

In operation 1614, the controller 120 determines whether to change a display style of the entire printer driver UI. In doing so, the display interface 130 may additionally display a dialog window for inquiring whether to change a display style of the entire printer driver UI. The user may select whether to change a display style of the entire printer driver UI through the displayed dialog window.

If a display style of the entire printer driver UI is changed, operation 1615 is performed. Otherwise, operation 1616 is performed.

In the operation 1615, the display interface 130 displays the entire printer driver UI by using the legacy style UI 20.

In the operation 1616, the display interface 130 displays a pop-up window for the pop-up print option by using the legacy style UI 20.

In the operation 1617, the controller 120 sets option information input by the user with respect to the pop-up print option displayed through the pop-up window. Also, if the option information is not with respect to the pop-up print option, the controller 120 sets the option information input by the user with respect to the print option.

Figure 17:
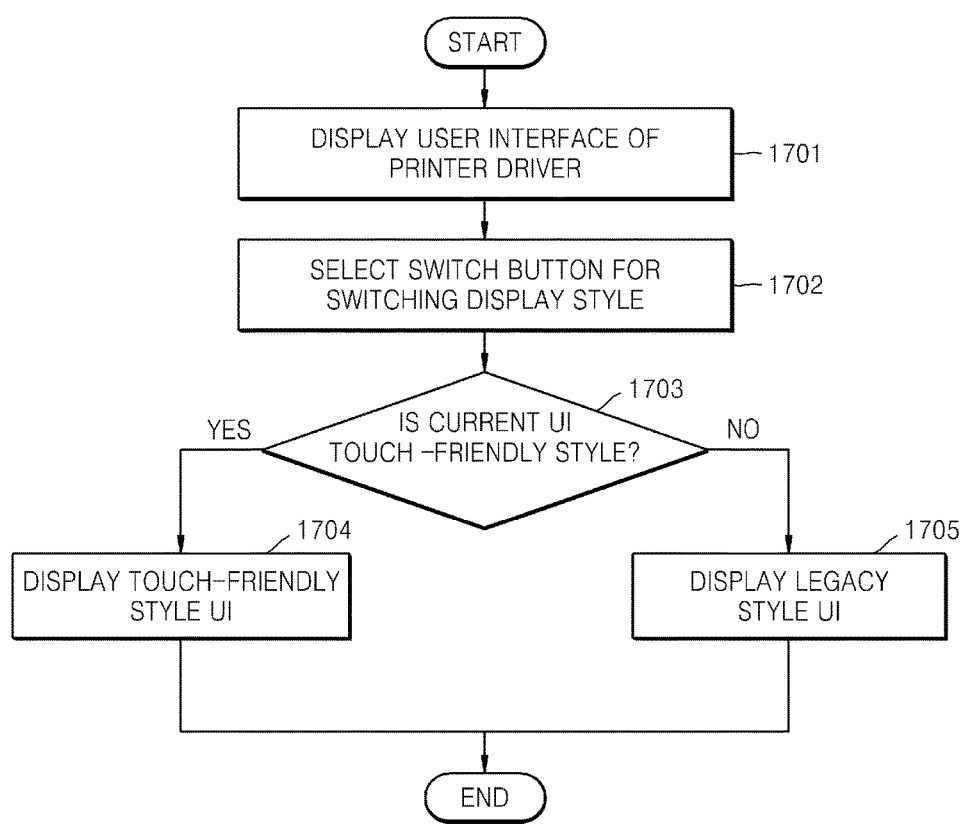
FIG. 17 shows a flowchart illustrating a method of providing a UI screen, according to an embodiment.

FIG. 17 is a flowchart for explaining a method of providing a UI screen, according to an embodiment.

The method of FIG. 17 relates to a method of switching a display style of the printer driver UI by clicking a switch button for switching a display style, which is performed by a user, regardless of the type of an input.

In operation 1701, the display interface 130 displays a UI corresponding to a printer driver.

In operation 1702, a user selects a switch button for switching a display style. The controller 120 may determine whether the switch button for switching a display style is selected.

In operation 1703, the controller 120 determines whether a current printer driver UI is the touch-friendly style UI 30 or the legacy style UI 20.

If the controller 120 determines that the current printer driver UI is the touch-friendly style UI 30, operation 1704 is performed. If the controller 120 determines that the current printer driver UI is the legacy style UI 20, operation 1705 is performed.

In operation 1704, the display interface 130 displays the printer driver UI by switching the current printer driver UI to the touch-friendly style UI 30.

In operation 1705, the display interface 130 displays the printer driver UI by switching the current printer driver UI to the legacy style UI 20.

Figure 18:
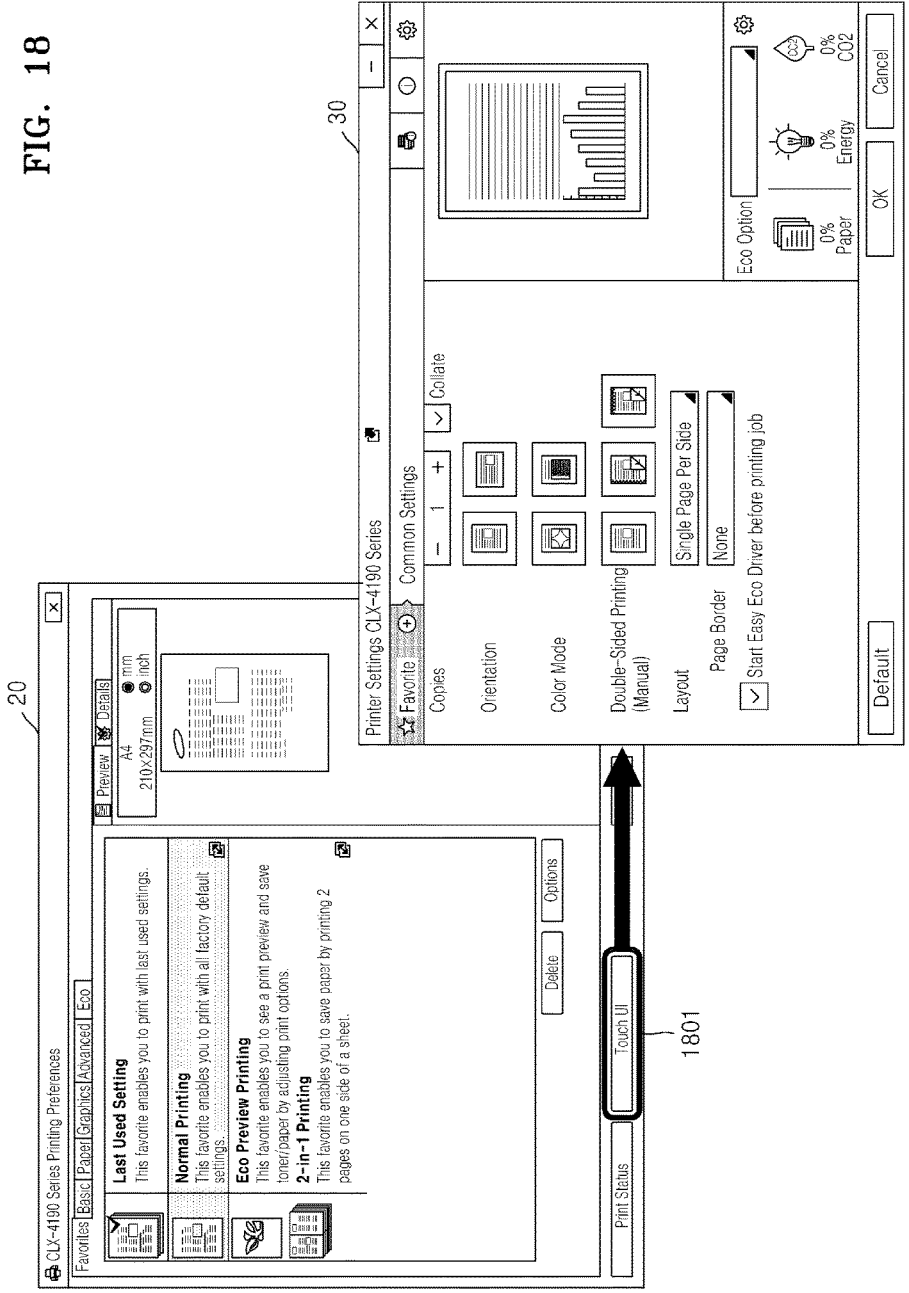
FIG. 18 illustrates switching of a display style of a printer driver UI by using a switch button for switching a display style, according to an embodiment.

FIG. 18 is a view for describing switching of a display style of a printer driver UI by using a switch button for switching a display style, according to an embodiment.

Referring to FIG. 18, it is assumed that the legacy style UI 20 is displayed in the display interface 130. A switch button 1801 for switching a display style, such as, Touch UI, may be displayed in the printer driver of the legacy style UI 20.

When the switch button 1801 is selected through the touch input 17 or the cursor input 19 by a user, the display interface 130 switches the display style to the touch-friendly style UI 30.

As described above, according to the one or more of the above embodiments of the present disclosure, because a UI corresponding to a printer driver optimized for the type of an input such as a touch input or a cursor input may be provided, a user may conveniently manipulate the printer driver UI.

In addition, other embodiments of the present disclosure can also be implemented through computer readable code/instructions in/on a medium, e.g., a computer readable medium, to control at least one processing element to implement any above described embodiment. The medium can correspond to any medium/media permitting the storage and/or transmission of the computer readable code. The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs).

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the present disclosure have been described with reference to the figures, it will be understood by those of ordinary skill in the art that various changes in form and details may be made therein without departing from the spirit and scope of the present disclosure as defined by the following claims.

What is claimed is:

1. A method for providing a user interface of a printer driver installed in a device, the method comprising:
   receiving a user input for manipulating the user interface;
   determining a type of input used for the received user input;
   determining a display style, among at least a first display style and a second display style, of the user interface corresponding to the determined type of input;
   determining whether a pop-up print option of the printer driver is selected by the received user input; and
   providing a pop-up window for the pop-up print option in the user interface in the first display style of the determined display style while providing a remainder of the user interface in the second display style, such that the pop-up window in the first display style and a portion of the remainder of the user interface in the second display style are simultaneously displayed.

2. The method of claim 1, wherein, in the providing of the user interface, the user interface of the printer driver is switchable to a different display style according to the determined type of input.

3. The method of claim 2, wherein the display style is a legacy style or a touch-friendly style.

4. The method of claim 1, wherein, in the determining of the display style of the user interface,
   a legacy style is determined as the display style if the determined type of input is a cursor input, and
   a touch-friendly style is determined as the display style if the determined type of input is a touch input.

5. The method of claim 1, wherein, in the determining of the display style of the user interface, if the determined type of input does not correspond to a first style, a second style that corresponds to the determined type of input is determined, and in the providing of the user interface, the user interface is provided by switching the first style that is currently displayed to the determined second style.

6. The method of claim 5, wherein, in the providing of the user interface, if the determined type of the input is a touch input in which the user interface is currently displayed in a legacy style, the user interface is provided by switching the legacy style to a touch-friendly style, and if the determined type of the input is a cursor input in which the user interface is currently displayed in the touch-friendly style, the user interface is provided by switching the touch-friendly style to the legacy style.

7. The method of claim 1, wherein, in the providing of the user interface, when the pop-up print option is selected by a touch input in which the user interface is currently displayed in a legacy style, the user interface is provided by displaying the pop-up window in a touch-friendly style, and when the pop-up print option is selected by a cursor input in which the user interface is currently displayed in the touch-friendly style, the user interface is provided by displaying the pop-up window in the legacy style.

8. The method of claim 1, further comprising: if it is determined that the pop-up print option is selected, determining whether to switch an entire user interface to the determined display style,
wherein, in the providing of the user interface, the user interface is provided by displaying at least one of the pop-up window and the entire user interface in the determined display style.

9. The method of claim 1, further comprising:
executing the printer driver; and
when the printer driver is executed, displaying the user interface in a default style depending on a current user interface design of an operating system (OS),
wherein, in the receiving of the user input, the user input for manipulating the user interface displayed in the default style is received.

10. The method of claim 1, wherein the printer driver includes at least one of a version 3 (V3) printer driver or a version 4 (V4) printer driver.

11. The method of claim 10, further comprising: if the printer driver is the V3 printer driver, storing in a shared memory printer driver information (Devmode) that is used by the printer driver of a legacy style and the printer driver of the touch-friendly style,
wherein, in the providing of the user interface, the user interface is switched to the legacy style or the touch-friendly style based on the stored printer driver information (Devmode).

12. A method for providing a user interface of a printer driver installed in a device, the method comprising:
displaying, in a first style, the user interface;
receiving a user input for manipulating the displayed user interface;
determining a type of input used for the received user input;
determining whether a pop-up print option of the printer driver is selected by the received user input;
if the determined type of input does not correspond to the first style, determining a second style corresponding to the determined type of input; and
providing a pop-up window for the pop-up print option in the displayed user interface by switching the first style to the determined second style in the pop-up window while maintaining a remainder of the user interface in the first style, such that the pop-up window in the second style and a portion of the remainder of the user interface in the first style are simultaneously displayed.

13. A non-transitory computer-readable recording medium having recorded thereon a program for executing the method of claim 1.

14. A device for providing a user interface of a printer driver installed in the device, the device comprising:
an input interface receiving a user input for manipulating the user interface;
a controller determining a type of input used for the received user input, determining a display style, among at least a first display style and a second display style, of the user interface corresponding to the determined type of input, and determining whether a pop-up print option of the printer driver is selected by the received user input; and
a display interface providing a pop-up window for the pop-up print option in the user interface in the first display style of the determined display style while providing a remainder of the user interface in the second display style, such that the pop-up window in the first display style and a portion of the remainder of the user interface in the second display style are simultaneously displayed.

15. The device of claim 14, wherein the user interface of the printer driver that is provided by the display interface is switchable to a different display style according to the determined type of input.

16. The device of claim 14, wherein the controller determines a legacy style as the display style if the determined type of input is a cursor input, and a touch-friendly style as the display style if the determined type of input is a touch input.

17. The device of claim 14, wherein, if the determined type of input does not correspond to a first style that is currently displayed, the controller determines a second style corresponding to the determined type of input, and the display interface provides the user interface by switching the first style that is currently displayed to the determined second style.

18. The device of claim 14, wherein, if it is determined that the pop-up print option is selected, the controller further determines whether to switch an entire user interface to the determined display style, and the display interface provides the user interface by displaying at least one of the pop-up window and the entire user interface in the determined display style.

19. The device of claim 14, wherein the controller executes the printer driver, and when the printer driver is executed, the display interface displays the user interface in a default style depending on a current user interface design of an operating system (OS), and the input interface receives the user input for manipulating the user interface displayed in the default style.

20. The device of claim 14, further comprising: if the printer driver is a V3 printer driver, a memory storing printer driver information (Devmode) that is used by the printer driver of a legacy style and the printer driver of the touch-friendly style, and the controller controls by using stored printer driver information (Devmode) such that the user interface is switched to the legacy style or the touch-friendly style.

21. A device for providing a user interface of a printer driver installed in the device, the device comprising:

a display interface displaying, in a first style, the user interface;
an input interface receiving a user input for manipulating the displayed user interface; and
a controller determining a type of the input interface used for the received user input, determining whether a pop-up print option of the printer driver is selected by the received user input, and if the determined type of input interface does not correspond to the first style, determining a second style corresponding to the determined type of input interface,
wherein the display interface provides a pop-up window for the pop-up print option in the displayed user interface by switching the first style to the determined second style in the pop-up window while maintaining a remainder of the user interface in the first style, such that the pop-up window in the second style and a portion of the remainder of the user interface in the first style are simultaneously displayed.

* * * * *